United States Patent [19]

Ninomiya et al.

[11] Patent Number: 5,220,508
[45] Date of Patent: Jun. 15, 1993

[54] POSITION AND HEADING DETECTING DEVICE FOR SELF CONTROLLED VEHICLE

[75] Inventors: Yoshiki Ninomiya, Nagoya; Yuzo Yamamoto, Aichi; Gunji Sugimoto, Kariya; Koichi Tange, Nagoya, all of Japan

[73] Assignee: Kabushiki Kaisha Toyota Chuo Kenkusho, Aichi, Japan

[21] Appl. No.: 634,613

[22] Filed: Dec. 27, 1990

[30] Foreign Application Priority Data

Dec. 28, 1989 [JP] Japan .................................. 1-340853

[51] Int. Cl.⁵ ............................................. G06F 15/50
[52] U.S. Cl. ............................. 364/449; 364/424.02; 358/103; 318/587; 180/168
[58] Field of Search .................... 364/443, 449, 424.02; 318/587; 358/103; 180/167, 168, 169

[56] References Cited

U.S. PATENT DOCUMENTS

| | | | |
|---|---|---|---|
| 4,628,453 | 12/1986 | Kamejima et al. | 358/103 |
| 4,652,803 | 3/1987 | Kamejima et al. | 364/424.02 |
| 4,819,169 | 4/1989 | Saitoh et al. | 364/424.02 |
| 4,862,047 | 8/1989 | Suzuki et al. | 358/103 |
| 4,905,151 | 2/1990 | Weiman et al. | 364/424.02 |
| 4,931,937 | 6/1990 | Kakinami et al. | 180/169 |
| 4,954,962 | 9/1990 | Evans, Jr. et al. | 364/424.02 |
| 5,040,116 | 8/1991 | Evans, Jr. et al. | 364/424.02 |
| 5,087,969 | 2/1992 | Kamada et al. | 358/103 |

Primary Examiner—Gary Chin
Attorney, Agent, or Firm—Oblon, Spivak, McClelland, Maier & Neustadt

[57] ABSTRACT

An outer environment of the vehicle is inputted as an image. Image processing is performed to the input image, and many edge segments are extracted. The edge segments which are colinear are clustered in order to perform a matching operation. Matching is performed in a respective set of plural longer edge segments representing plural clusters in correspondence with a set of plural guide signs as standards of guide of the vehicle mapped on the image input surface, and a set of longer edge segments being most matched each other is extracted. From position and headings of the extracted longer edge segments on the image input surface, the position and heading in the outer environment are calculated. The position and heading of the vehicle are detected from these values. The position and heading of the vehicle obtained in the above-mentioned image processing and the position and heading of the vehicle measured by other techniques and are evaluated synthetically. When the guide signs are mapped on the image input surface, the forecast values of position and heading of the vehicle at the image input time are used. In this manner, the detecting accuracy of the position and heading of the vehicle is improved.

14 Claims, 18 Drawing Sheets

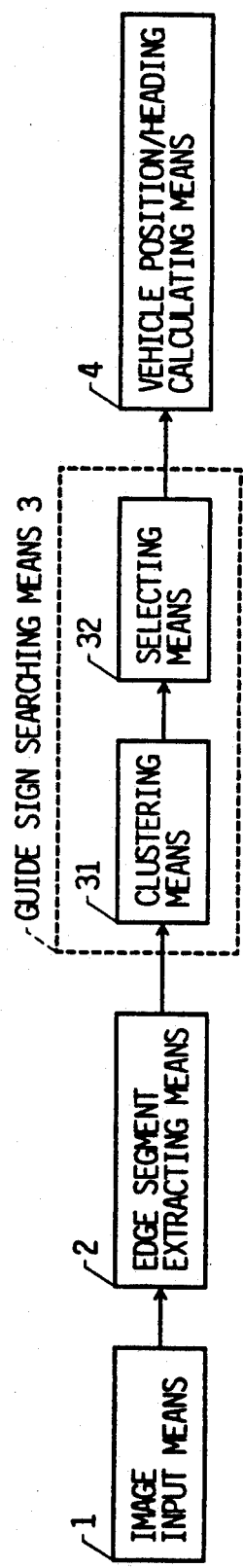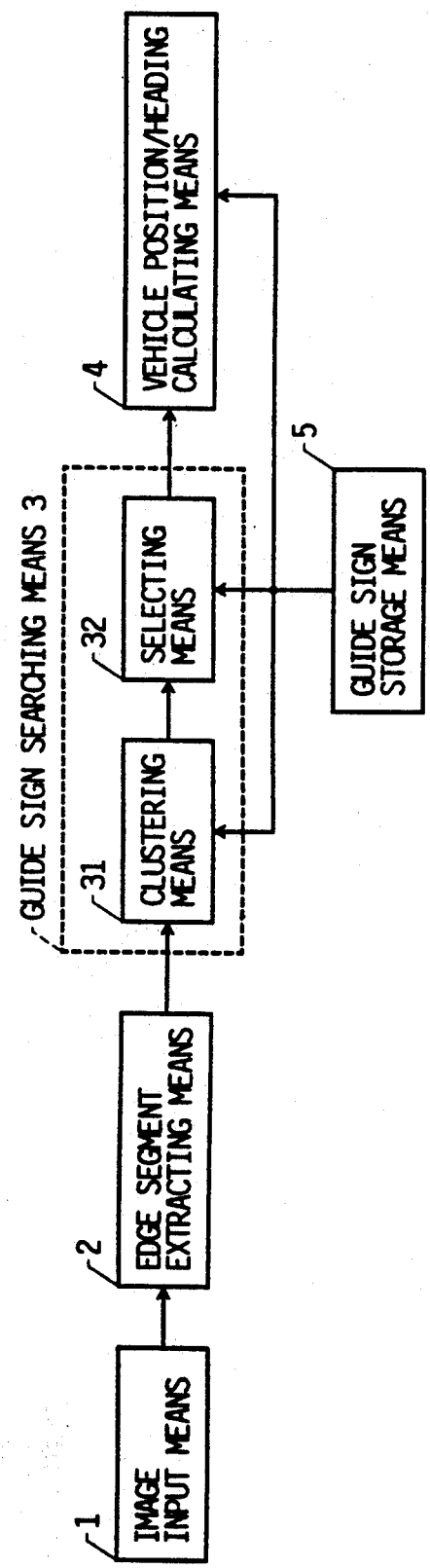

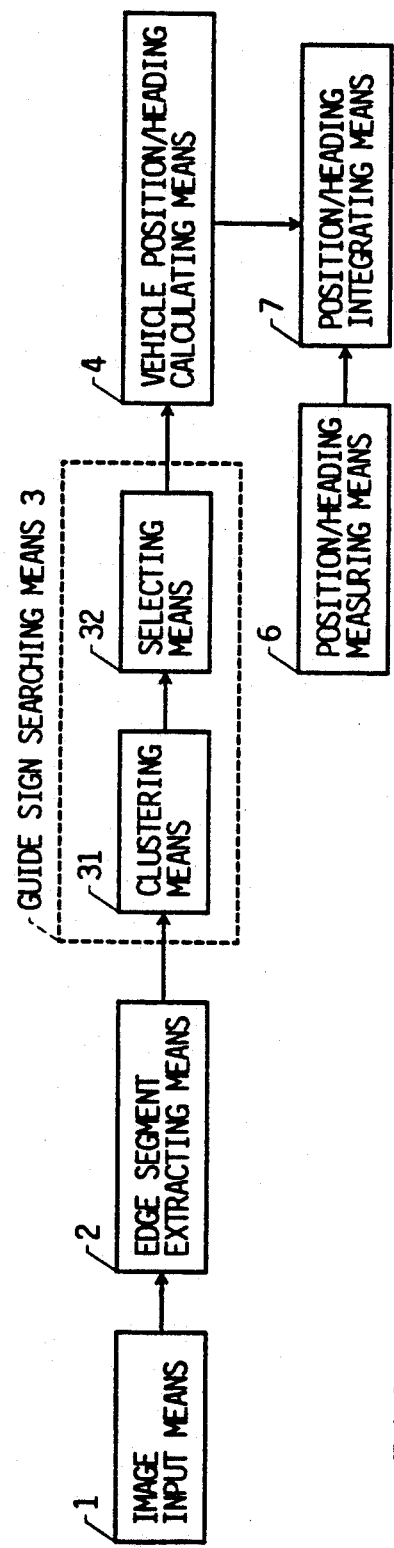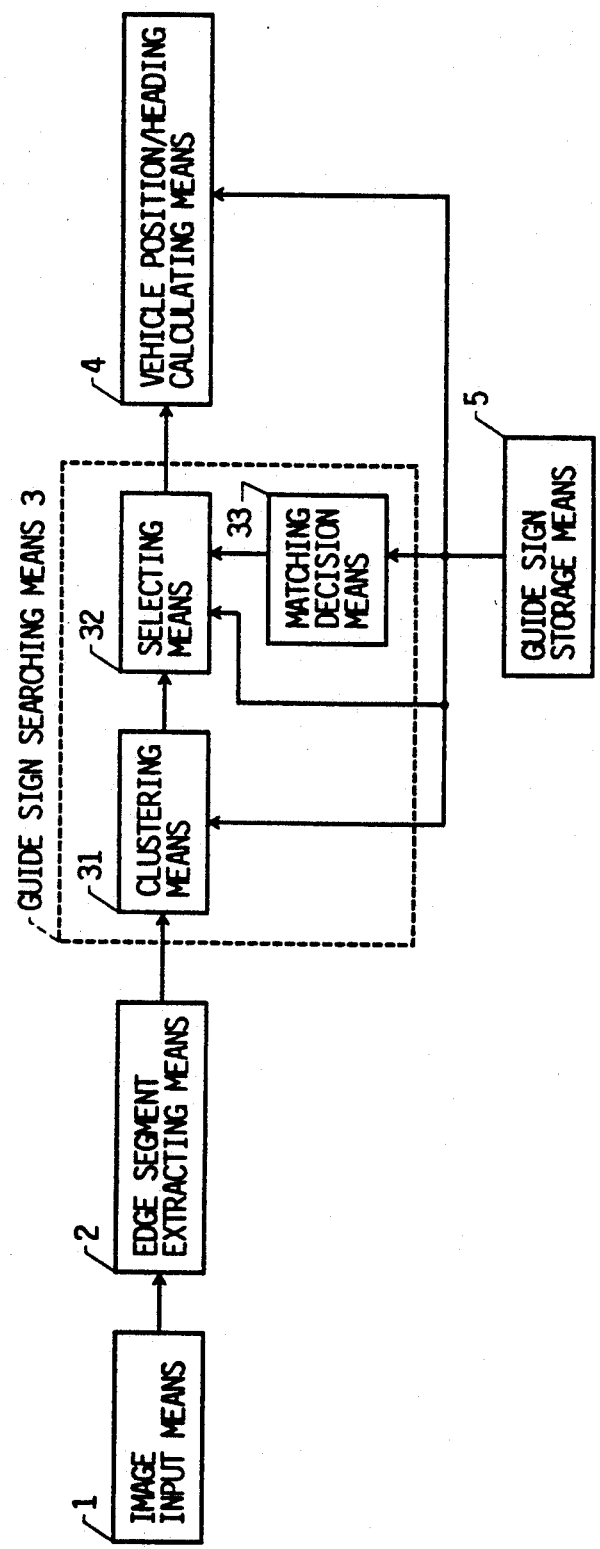

(INPUT IMAGE)

(EDGE SEGMENT)

$D_1$ AND $D_2$ ARE THE EXISTING REGIONS OF THE GUIDE SIGNS

LONGER EDGE SEGMENTS FORMED BY LEAST SQUARE METHOD

MAPPED STANDARD GUIDE SIGN (EXTRACTED LONGER EDGE SEGMENTS)

F I G. 2 5

STEP 1. CALCULATION OF (xw, yw, θw)
(BACK GROUND PROCESS EVERY 50 m sec)

STEP 2. CALCULATION OF (xb, yb, θb)
(AT IMAGE INPUT TIME)

STEP 3. CALCULATION OF (xv, yv, θv)
(BY IMAGE PROCESSING)

STEP 4. CALCULATION OF (xo, yo, θo)
(AT FINISHING TIME OF CALCULATIION IN IMAGE PROCESSING)

STEP 5. CALCULATION OF DIFFERENCE (xl, yl, θl)
BETWEEN (xo, yo, θo) AND (xb, yb, θb)
(BY SUBTRACTION)

STEP 6. CALCULATION OF (xm, ym, θm) BY INTEGRATING
(xb, yb, θb) AND (xv, yv, θv)
(BY WEIGHTED MEAN)

STEP 7. CALCULATION OF (xc, yc, θc)
(xo, yo, θo) + (xl, yl, θl) → (xc, yc, θc)
(BY MODYFIED ADDITION)

POSITION AND HEADING DETECTING DEVICE FOR SELF CONTROLLED VEHICLE

BACKGROUND OF THE INVENTION

1. Field of the Invention

The present invention relates to a guiding device for a self controlled vehicle used for conveyance in fields of manufacturing and distribution. More particularly, the invention relates to a detecting device for detecting position and heading of the vehicle based on image information obtained by a TV camera in an environment such as a factory which has an artificial passage determined previously.

2. Description of the Prior Art

At present, an example of an unmanned vehicle is an AGV (automated guided vehicle) for conveyance in a factory. A guidance system used in this case requires construction work to embed guide lines in a floor or stretch an optical tape on the floor. Consequently, problems exist in that change of the traveling course is not easy and the maintenance management of such guidance facilities is necessary. Also since the vehicle can travel only just on the guide lines, flexibility of the traveling is low.

In order to solve these problems, a guidance system for a self controlled vehicle not requiring special facilities for the guidance has been proposed in which a mark of guidance (guide sign) is detected from an image inputted by a vehicle-carried TV camera and the vehicle is guided along the guide sign.

Such a guidance system based on information from a TV camera in the prior art is disclosed in Japanese laid-open patent publication No. 133183/1989. In the prior art, in order to detect a position of unmanned vehicle, edge segment information of a road side extracted from an input image of a TV camera is used. However, under actual environment, since many brightness noises are mixed in the input image, for example, due to unevenness of the traveling road surface, outer disturbance rays, illuminating conditions varying in many ways and the like, the extracted edge segment is finely broken. Consequently, it is quite difficult that only an edge of a road side or a structure being a guide sign is ideally extracted as a long segment necessary for the position detection. Also in the prior art, since an only edge of a passage side is specified as the guide sign, a problem exists in that the traveling area is limited.

In addition to this, the prior art disclosed in The Second "Image Sensing Technology Symposium in Industry" pp. 161-166 "Image Recognition of Passage in a Factory" is also known. In the prior art, a white line with specific width is detected as a guide sign from a TV camera image, and position and headings of a self controlled vehicle are determined, whereby the self controlled vehicle is guided. In this system, since the guide sign is limited to the white line with specific width, a problem exists in that flexibility in application is low.

SUMMARY OF THE INVENTION

An object of the invention is to solve such problems in a guidance system for a self controlled vehicle using an image in which operation can be effected only under the limited environment conditions and the guide sign is limited to an edge of a passage side or a white line with specific width thereby lowering flexibility to the application.

Another object of the invention is to provide a detecting device of position and heading for a self controlled vehicle guided not by a specific sign such as a white line but by a versatile guide sign, thereby extending application range of a conventional self controlled vehicle using image information. In order to achieve the above objects, a detecting device of position and heading of a self controlled vehicle is characterized by obtaining a longer edge segment approximating segments being on the same line, the segments being extracted among many broken edge segments obtained from an input image by a TV camera, and making the longer edge segment a guide sign for determining a position and heading of the self controlled vehicle.

FIRST FEATURE OF THE INVENTION

The first feature of the invention is in that a camera input image of actual environment is searched for edge signs (guide signs) not limited to a white line or a passage side edge, and self position and heading of a vehicle is calculated based on the position of the linear edge signs on the image.

Its constitution as shown in FIG. 1 comprises image input means 1 for inputting images of an outer environment of a self controlled vehicle; edge segment extracting means 2 for receiving an image inputted by the image input means 1 and for extracting and outputting only edge segments of the image; guide sign searching means 3 constituted by clustering means 31 for inputting the edge segments extracted by the edge segment extracting means 2 and for evaluating alignment property of the many edge segments based on respective mutual angle and distance between any one of the plural edge segments and another and for assembling the edge segments evaluated to be on the same line into one longer edge segment and for outputting such longer edge segments, and selecting means 32 for selecting among the longer edge segments outputted from the clustering means 31 the longer edge segment corresponding to at least one guide sign based on at least one of the reference position and the reference angle set corresponding to the outer environment; and vehicle position/heading calculating means 4 for transforming the extracted longer edge segment corresponding to the guide sign, searched for by the guide sign searching means 3 into coordinates fixed to the outer environment and for calculating the vehicle position with respect to the extracted longer edge segment in the transformed coordinates so as to calculate the absolute position and heading of the vehicle.

Next, a function will be described regarding the first feature of the invention.

A camera input image of actual environment is searched for a guide sign of a linear edge being not limited to a white line or a passage side edge, and a self position and heading of the vehicle is calculated based on the position of the guide sign having the image searched for.

First, the image of the passage is inputted by the image input means 1, and grey edge segments are extracted from the inputted image by the edge segment extracting means 2. Thereby only edge sign can be extracted from the image.

Under actual environment, in the edge segments outputted from the edge segment extracting means 2, the guide sign on the image is made from a set of broken edge segments and many unnecessary noise edge segments are mixed. Consequently, the edge segments extracted by the edge segment extracting means 2 are first inputted to the clustering means 31, and alignment property is evaluated for the many edge segments based on respective mutual angle and distance between any one of the plural edge segments and another. The edge segments evaluated to be on the same line are assembled into one longer edge segment. A set of broken edge segments corresponding to the guide sign are detected as one longer edge segment. Each longer edge segment is outputted from the clustering means 31.

Next in the selecting means 32, a specific longer edge segment corresponding to the guide sign is extracted as a guide sign candidate among the longer edge segments outputted from the clustering means 31 based on at least one of the reference position and the reference angle set corresponding to outer environment condition. Thereby the extracted longer edge segment as a guide sign candidate can be reproduced correctly from many broken segments mixed with many noise segments.

Next in the vehicle position/heading calculating means 4, the extracted longer edge segment as the guide sign candidate on the image coordinates searched for by the guide sign searching means 3 is transformed into the coordinates fixed to outer environment. The vehicle position with respect to the extracted longer edge segment in the transformed coordinates is calculated, whereby the position and heading of the vehicle are calculated. Therefore since the position and heading of the vehicle in the coordinate system fixed to the outer environment can be obtained, the vehicle can be guided in accordance with any rule.

In the first feature of the invention, since the guide sign is specified not as a specific mark or a white line but only as the edge segment, selective range of the guide sign is wide. Also the guide sign need not be newly set but may be selected from existing environment. Further since the edge sign is relatively strong against noise, adaptability to environment becomes high.

Since the edge segment extracting means 2 compresses the inputted image and takes a grey edge segment necessary for searching the guide sign, searching processing of the guide sign can be performed easily at high speed by the guide sign searching means 3 at next stage. Thereby use of the edge segments having relatively high conservation property with respect to environment conditions becomes possible, and application range of the device can be extended.

The clustering means 31 inputs the edge segments outputted from the edge segment extracting means 2 and performs clustering processing, whereby the edge segments included in the same line are made one longer edge segment. Under actual environment, the guide sign is outputted, due to illuminating condition, an obstacle, contamination, breakage or the like, not as one long edge segment but as several broken short edge segments, from the edge segment extracting means 2. However, the original longer edge segment is reproduced from a set of the broken short edge segments, thereby enabling search for original guide sign, improving the adaptability to the environment and extending the application range of the self controlled vehicle.

Since the selecting means 32 is provided, the extracted longer edge segment corresponding to the guide sign can be selected. Consequently under actual environment, even when many noise segments are mixed on the image input plane or the guide sign cannot be entirely detected, the guide sign can be selected and the adaptability to the environment is improved and application range of the self controlled vehicle can be extended.

Namely, according to the first feature of the invention, at least one longer edge segment by assembling the edge segments decided to be on the same line can be extracted among many grey edge segments obtained from the input image of the outer environment. Further, the specific longer edge segment corresponding to the guide sign is selected among the longer edge segments based on at least one of the reference position and angle set corresponding to the outer environment. The position and heading of the vehicle in the coordinates fixed to the outer environment can be calculated and determined based on the extracted longer edge segment.

Consequently, the guide sign can be selected even under actual environment where finely broken grey edge segments only can be obtained from the input image on account of noise components due to outer disturbance rays, widely varying illuminating condition and unevenness of the traveling road surface, thus preventing grasp of the longer edge segment to be determined as the guide sign. As a result, the position and heading in coordinates fixed to the outer environment of the self controlled vehicle, i.e., the absolute position and heading can be detected. Also since the guide sign represented by the extracted longer edge segment is not limited to a specific passage side or a white line with specific width, advantages exist in that the traveling area is not limited and flexibility of the application is high.

As above described, since the position and heading of the vehicle required for guiding the vehicle can be detected, guidance of the self controlled vehicle based not on a specific feature such as a white line but on a versatile guide sign under various illuminating conditions becomes possible.

DESCRIPTION OF OTHER FEATURES OF THE INVENTION

Other features of the invention will be described laying stress on differences from the first feature of the invention as follows.

SECOND FEATURE OF THE INVENTION

The second feature of the invention as shown in FIG. 2, in addition to the first feature, is provided with guide sign storage means 5 for storing at least position information of the guide sign in every area the position information about guide signs per each area in order to set the guide sign corresponding to each area of the outer environment of the self controlled vehicle. The guide sign searching means 3 selects and outputs the longer edge segments as guide sign candidates based on information from the guide sign storage means 5.

When the guide sign which is to be searched from the image input plane and to be based on in guidance is not stored restriction, for example, "Travel always at 1 m to the right from the white line." is necessary. In this case, throughout the traveling area, any specific guide sign corresponding to the traveling location must be prepared previously, and the traveling operation is also limited. Therefore in the second feature of the invention, the guide sign storage means 5 is provided so that the guide sign to be utilized per each traveling location may be changed or the traveling area may be treated independently of the guide sign position.

The edge segment as the guide sign is previously determined per each traveling area, and position, angle, end point, intersection, feature of the edge or the like for the guide sign is previously stored in the guide sign storage means 5. During traveling, the guide sign searching means 3 searches the image for the extracted longer edge segment as the guide sign candidate based on the position of the guide sign stored in the guide sign storage means 5. The vehicle position and heading calculating means 4 calculates the position and heading of the vehicle based on the position and heading of the extracted longer edge segment in coordinates fixed to the ground and the guide sign stored in the guide sign storage means 5.

Accordingly, the second feature of the invention is provided with the guide sign storage means 5 so that the guide sign can be arbitrarily selected per each traveling area. Therefore specific guide sign need not be prepared throughout the traveling area, and also the traveling operation is not limited by the position relative to the guide sign.

THIRD FEATURE OF THE INVENTION

The third feature of the invention as shown in FIG. 3, in addition to the first feature, comprises position/heading measuring means 6 for physically measuring the position and heading of the vehicle, and integrating means 7 for integrating a position and heading obtained by the measuring means 6 and an estimated position and heading obtained by the calculating means 4 and for making the integrated position and heading, as indices of the guidance of the self controlled vehicle.

Since the image processing requires much time, the following calculation of position and heading by the vehicle position/heading calculating means 4 can be performed only at certain time interval as shown in FIG. 24. Also entire components of the estimated position and heading as the calculation result cannot be always obtained. For example, components in parallel to the guide sign cannot be measured sometimes. Therefore the third feature of the invention is provided with the position/heading measuring means 6 based on counting of rotation of a wheel, in which the measuring of position and heading is performed independently of the estimation of the position and heading by the image processing. Also the integrating means 7 integrates the forecasted and estimated position and headings of the vehicle obtained by both means, respectively, taking account of the measuring interval, the accuracy or the like, in order to improve the accuracy of the calculated position and heading.

Since the position/heading measuring means 6 is installed, the position and heading being different from that calculated by the position/heading calculating means 4 in measuring period and error can be obtained. These values are integrated by the position/heading integrating means 7 to give effects that the measuring error of the finally decided position and heading of the vehicle is decreased and the reliability of the measuring can be improved.

FOURTH FEATURE OF THE INVENTION

The fourth feature of the invention as shown in FIG. 4 is provided with guide sign storage means 5 for storing a plurality of guide signs respectively in each traveling area of a self controlled vehicle in similar manner to the second feature, and the guide sign searching means 3 has matching decision means 33 for deciding matching property among a plurality of guide sign candidates and for suppressing erroneous selection of selecting means.

In the first and second features, in principle, the device acts even when only one guide sign is seen in the input image plane. On the contrary, in the fourth feature of the invention, when a plurality of guide signs are seen in the input image plane, the matching decision means 33 utilizes this redundant information and can assist the searching processing of the searching means 3. Namely, when a plurality of guide signs exist, selecting means 32 selects the respective longer edge segment corresponding to the respective guide sign as the guide sign candidates. The matching decision means 33 decides the matching property among the longer edge segments by a scattering value of the respective position and heading of the vehicle decided on the basis of the respective longer edge segment, and outputs the decision result to the selecting means 32. The selecting means 32 determines the respective extracted longer edge segment for the respective guide sign based on the matching property.

Under actual environment, edge segments outputted by the edge segment extracting means 2 include segments as noise other than the guide signs, and the guide signs can be partially extracted in most cases. Therefore in the fourth feature, a plurality of guide signs are seen on the input image plane and the selecting means 32 determines the set of extracted plural longer edge segments best matched with each other. Consequently, the selection error of the guide signs due to mixing of the noise segments in the selecting means 32 can be suppressed. As a result, the fourth feature of the invention has effects in that the adaptability to the actual environment is improved and application range of self controlled vehicles can be extended.

FIFTH FEATURE OF THE INVENTION

In the fifth feature of the invention as shown in FIG. 5, guide sign storage means 5 similar in manner to the second feature stores a plurality of guide signs respectively in each traveling area of a self controlled vehicle, and the guide sign searching means 3 can deal with a plurality of guide signs. Namely, the fifth feature is provided with camera calibration means 8 where redundancy of a plurality of guide signs is utilized for calibrating camera parameters used in position/heading calculating means 4 to improve the calculation accuracy of position and headings.

When a plurality of guide signs are seen in the input image plane, the camera calibration means 8 utilizes this redundant information and can correct camera parameters used in the position/heading calculating means 4. That is, when a plurality of guide signs exist, the selecting means 32 decides the respective extracted longer edge segment corresponding to the respective guide sign. From the respective position and heading of the vehicle decided on the basis of the respective extracted longer edge segment, the camera calibration means 8 corrects camera parameter values such as tilt angle used in coordinate transformation operator, and the calculation accuracy of the position and heading is improved.

Since the camera calibration means 8 is installed, when a plurality of guide signs are seen on the input image plane, camera parameter, for example, tilt angle is calibrated, and the camera parameter value used in the coordinate transformation operation of the position and heading calculating means 4 can be calibrated. Consequently, the fifth feature of the invention has effects in that influence of shaking of the vehicle under actual environment or influence of setting error of the camera parameter can be suppressed, and accuracy and reliability of the estimation of the position and heading can be improved.

SIXTH FEATURE OF THE INVENTION

The sixth feature of the invention as shown in FIG. 6, in addition to the first feature, is provided with position/heading forecast means 9, where the position and heading of a self controlled vehicle at image input time by image input means are forecasted, and the forecasted values are applied to processing by the guide sign searching means 3 and the position/heading calculating means 4, thereby improving the processing speed and reliability.

The forecast means 9 forecasts the position and heading of the vehicle at the image input time by the image input means 1 as an image input time forecasted position and heading, based on values of the position and heading of the vehicle measured previously or the position and heading of the vehicle measured by the measuring means 6. These values are used during searching processing by the guide sign searching means 3, for example, in following manner. The guide sign on the image is forecasted by the coordinate transformation based on the forecasted position and heading. Forecast region of the guide sign is calculated from range of error of the image input time forecasted position and heading. Window processing by this region is performed before the clustering means 31. In the selecting means 32, the image input time forecasted position and heading are made indices in the selection of the longer edge segment. Further in the calculating means 4 for calculating position and heading of the vehicle, in case that in relative position between the vehicle and the extracted longer edge segment, a parallel component with respect to the extracted longer edge segment can not be calculated, the component is calculated from the forecasted position and heading at the image input time.

The sixth feature of the invention is provided with the position and heading forecast means 9, whereby the position and heading of the vehicle at the image input time can be forecasted, and it can be forecasted at which position in the image input plane the guide signs exist. Consequently, the clustering can be limited by the clustering means 31 to a region where the guide signs may exist. Thereby the processing time can be reduced, and possibility of mistaking the processing can be decreased. Further since difference from the forecasted position is made one factor of an evaluation function when the guide signs are selected by the selecting means 32, the sixth feature has effects in that the selecting processing becomes exact.

Also since the forecast means 9 can hold the forecasted position and heading of the vehicle at the image input time, even if time delay exists between the image input time and the calculation finishing time of the position and heading by the image processing, integrating of the image input time forecasted position and heading calculated by measuring means 6 and the image input time estimated position and heading calculated by the position/heading calculating means 4 can be performed. Thereby since some margin can be given to the image processing time, the sixth feature has effects in that scale of the hardware can be suppressed.

BRIEF DESCRIPTION OF THE DRAWINGS

FIGS. 1 through 6 are block diagrams showing constitution of the first to sixth features of the invention respectively;

FIG. 25 is a chart showing processing steps in the embodiment; and

DESCRIPTION OF THE INVENTION

An embodiment of the invention will be described in detail referring to the accompanying drawings as follows.

Figure 5:
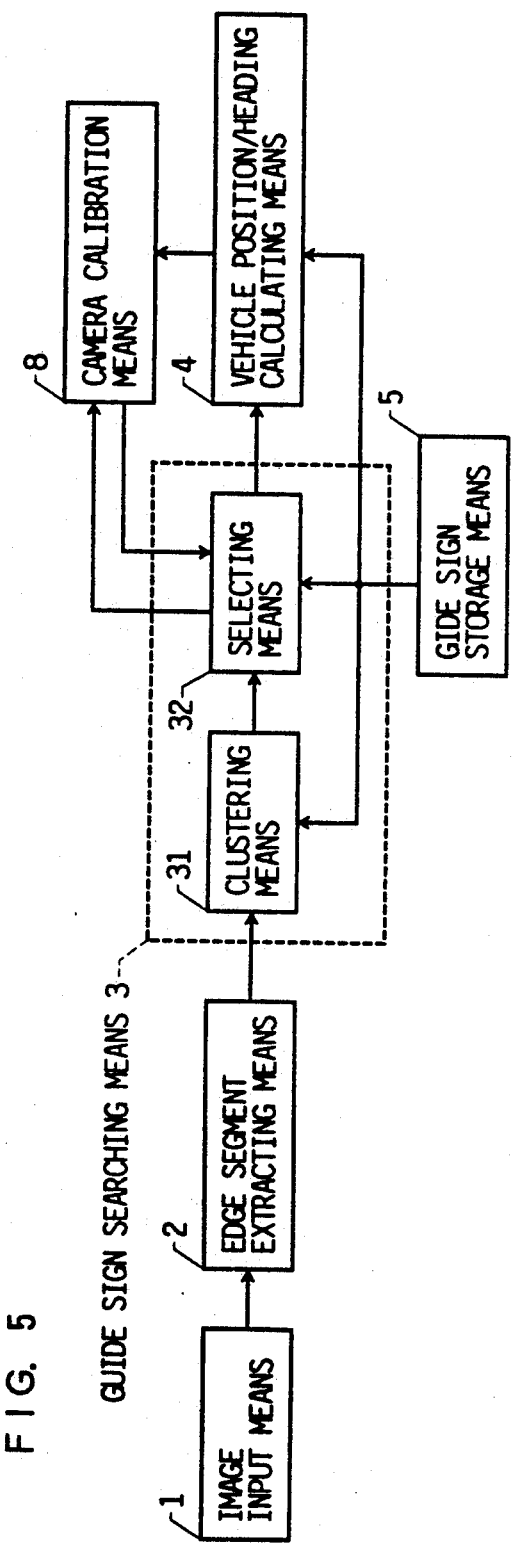
Figure 6:
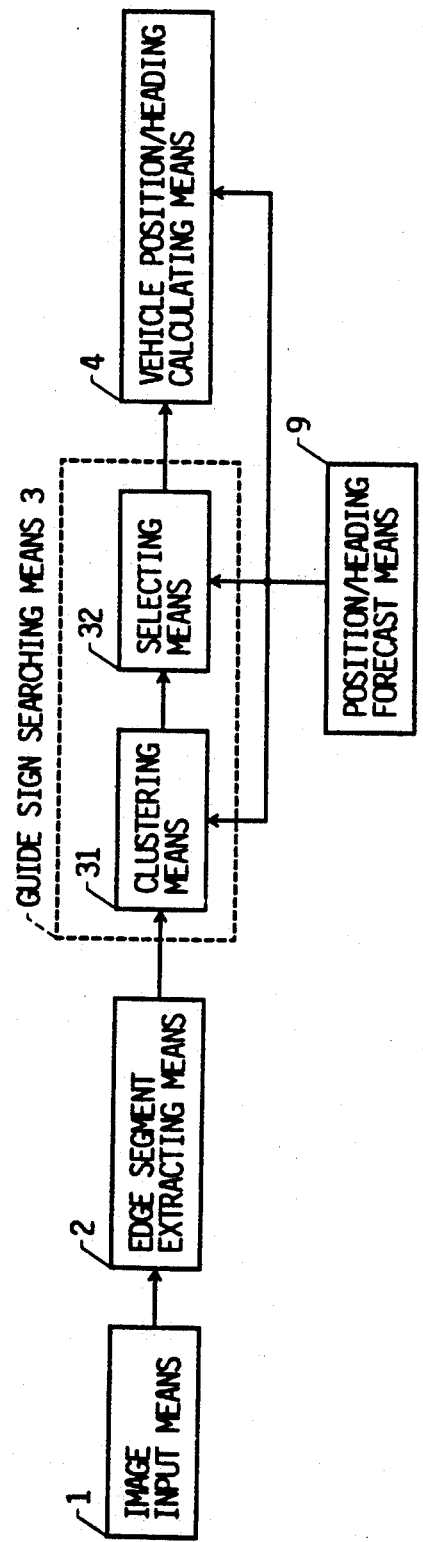
Figure 7A:
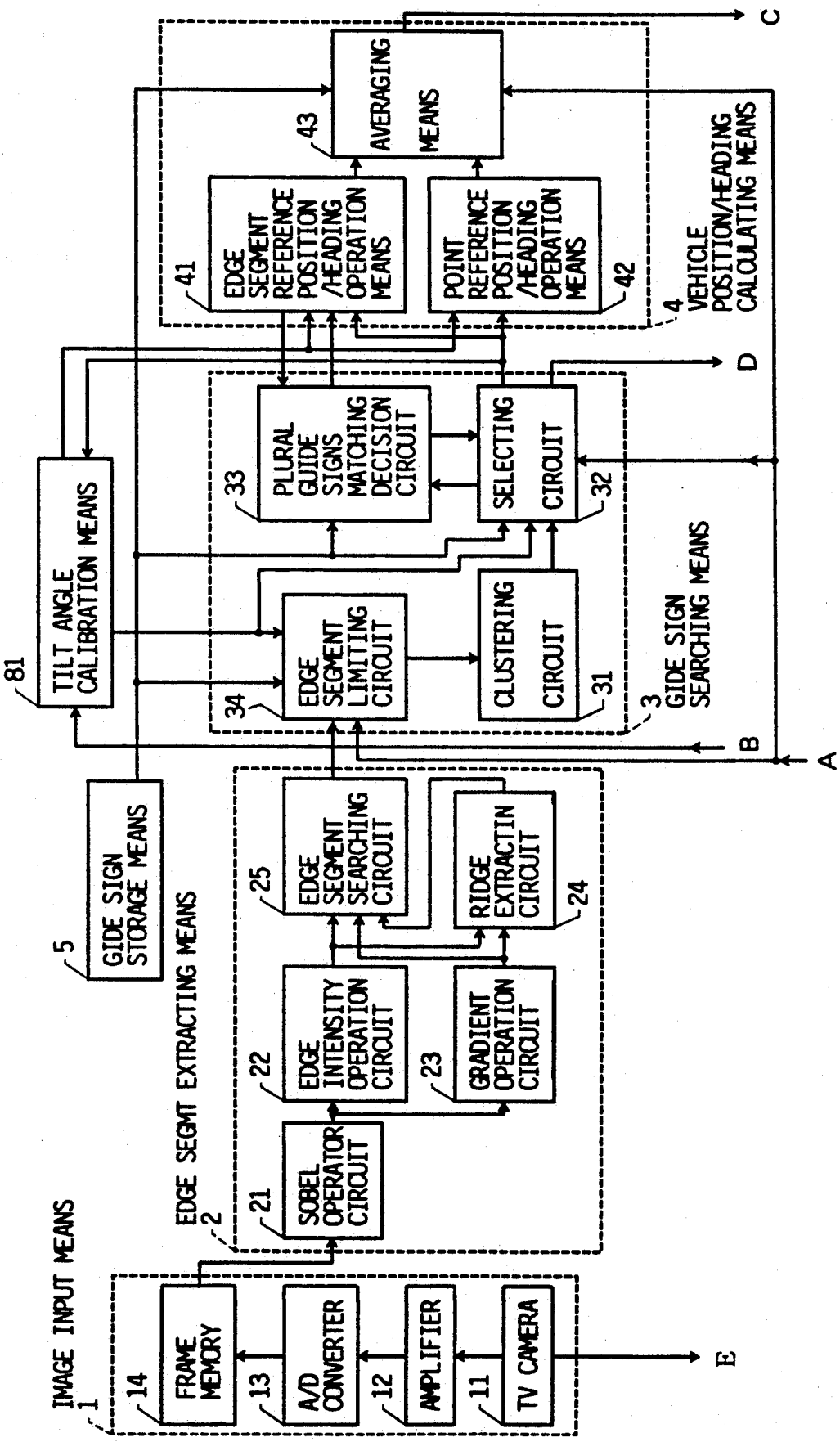
FIGS. 7A and 7B are block diagrams showing constitution of an embodiment of the invention.
Figure 7B:
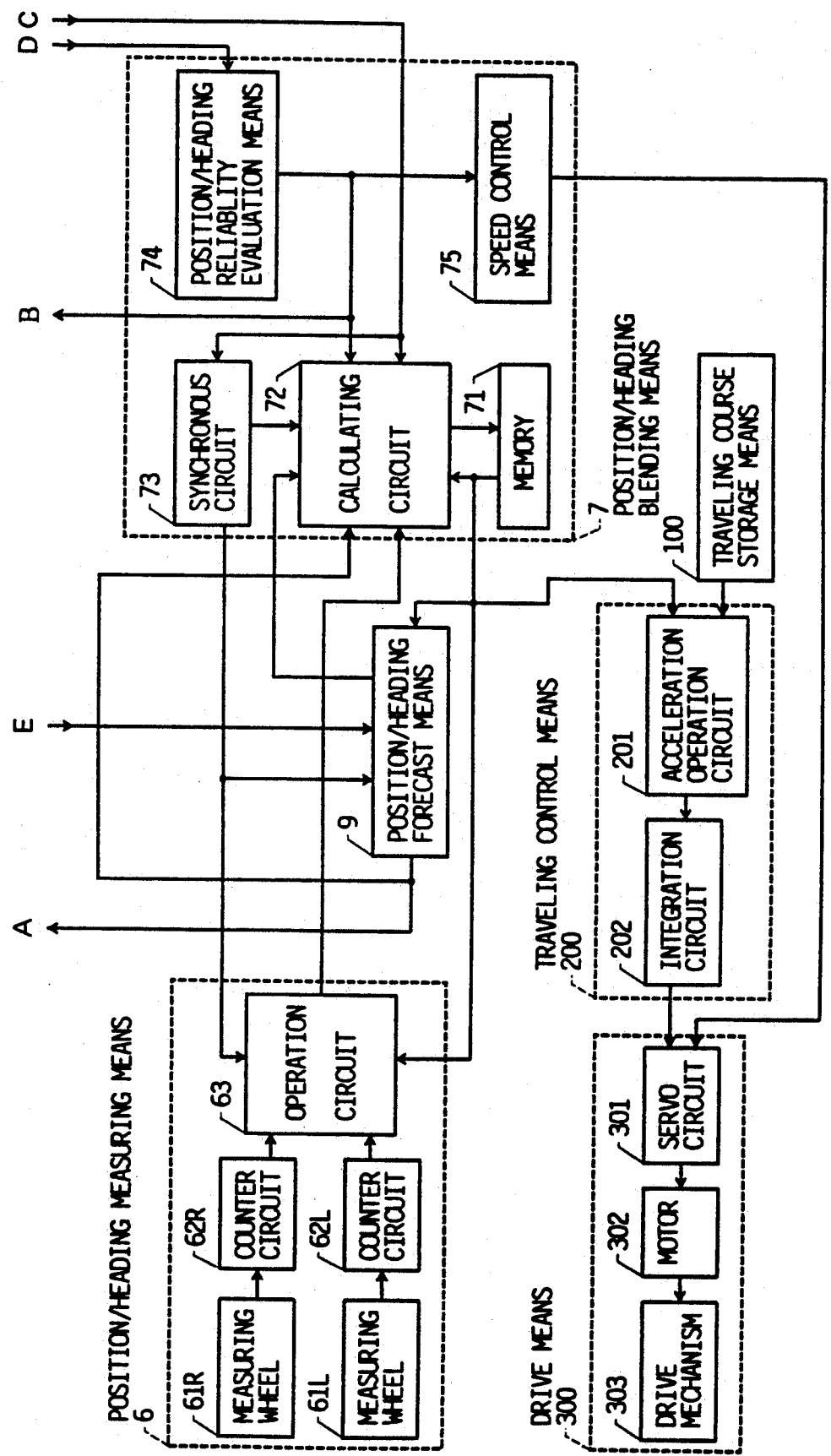

The device of the embodiment relates to application of the present invention to a guidance device for a self controlled vehicle traveling along a course on a predetermined traveling plane without using guide lines. A block diagram thereof is shown in FIGS. 7A and 7B. In the hereinafter description, a self controlled vehicle is referred to simply as a vehicle.

In the embodiment as hereinafter described, position and heading of predetermined guide signs which are indices for detecting position and heading of the vehicle, and edge segments and so on extracted from an input image taken by a TV camera are suitably subjected to coordinate transformation between a plurality of coordinate systems. First, the coordinate transformation will be described.

Figure 8:
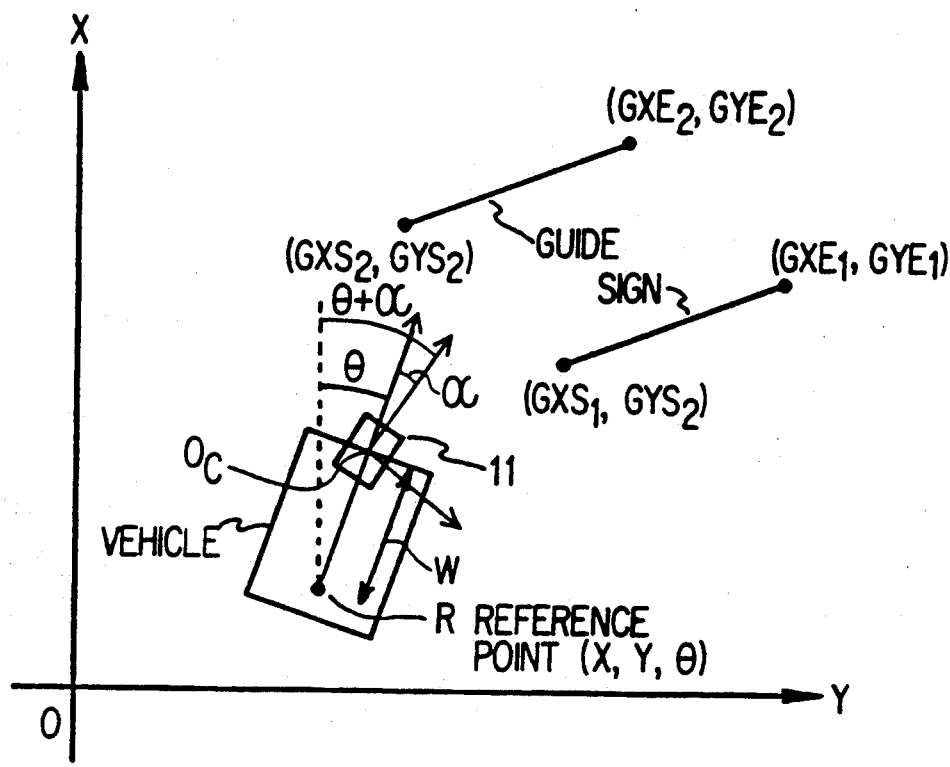
FIGS. 8 through 10 are diagrams showing coordinate system used in the embodiment respectively.
Figure 9:
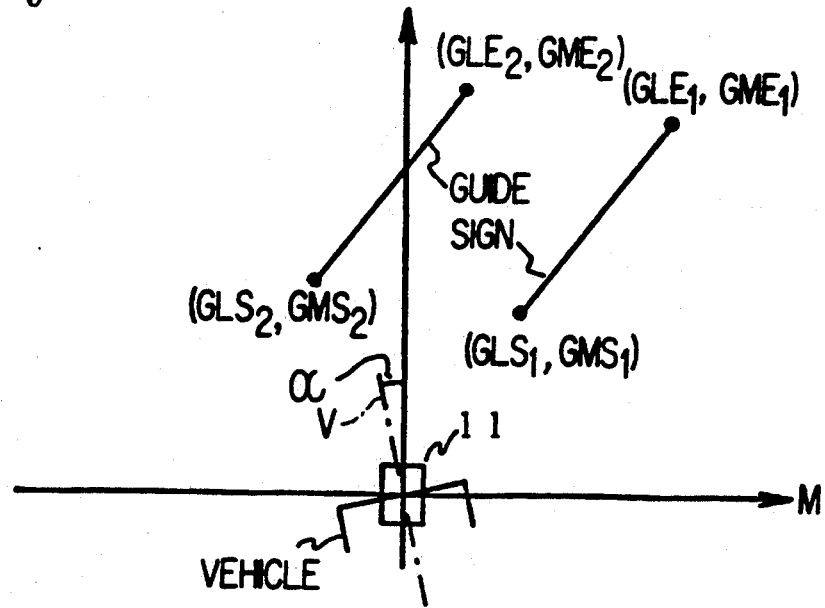
Figure 10:
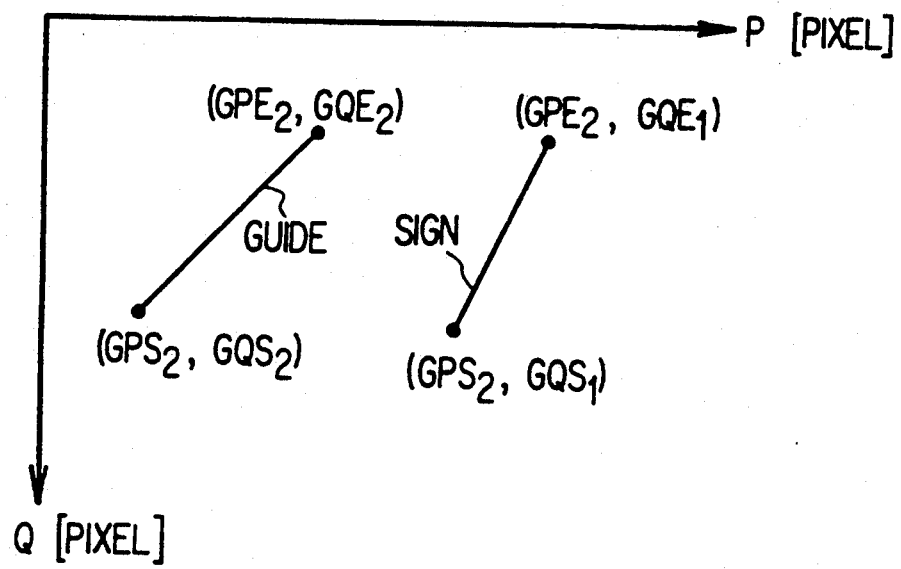

Three coordinate systems are used in the device of the embodiment. First is as shown in FIG. 8 a standard coordinate system fixed to the ground on a traveling plane of the vehicle representing an absolute position on the ground (hereinafter referred to as "x-y coordinate system"). Second is as shown in FIG. 9 a relative coordinate system fixed to the TV camera, whose origin $O_c$ is the TV camera center, representing a relative position of any point on the ground to the TV camera (hereinafter referred to as "l-m coordinate system"). Third is as shown in FIG. 10 an absolute coordinate system fixed to an input image plane of the TV camera (hereinafter referred to as "p-q coordinate system"), representing an absolute position on the input image.

In the embodiment, a current position and heading of the vehicle determined finally is given by coordinates (x, y) of the reference point R on the vehicle in the x-y coordinate system and angle $\theta$ formed between a vehicle heading V representing a running direction of the vehicle and the x-axis in the form of (x, y, $\theta$). The reference point R is set, for example, as a middle point between the lateral drive wheels of the vehicle. The TV camera is as shown in FIG. 8 installed on the front side of the vehicle and spaced by distance W from the reference point R. The TV camera is directed in general to the direction l of angle $\alpha$ on a horizontal plane from the vehicle heading V and tilt angle t against the horizontal plane, being at position of height h from the traveling plane. On the other hand, the image input plane is at the position that its center is spaced from the center of the TV camera by distance f corresponding to the focal length of the lens. Each ratio of pixel numbers $d_p$, $d_q$ in the p, q-axes directions on the image input plane to the corresponding actual distances $r_p$, $r_q$ on the plane takes constant value s proper to the used image input device (for example CCD). Consequently, the coordinate transformation between any position (x, y) in the x-y coordinate system and any position (p, q) in the p-q coordinate system can be obtained by the following operator (1) in a homogeneous coordinate representation.

$$T = T_2 \cdot T_1 \quad (1)$$

In this case, the transformation matrix $T_1$ from the x-y coordinate system to the l-m coordinate system is expressed by a matrix product of a translation matrix $M_1$ and a rotation matrix $M_2$ between the two coordinate systems as the following equation.

$$T_1 = M_1 \cdot M_2 \quad (2)$$

The matrices $M_1$ and $M_2$ are represented by $$M_1 = \begin{bmatrix} 1 & 0 & 0 \\ 0 & 1 & 0 \\ -x - W \cdot \sin\theta & -y - W \cdot \cos\theta & 1 \end{bmatrix}$$

$$M_2 = \begin{bmatrix} \cos(\theta + \alpha) & \sin(\theta + \alpha) & 0 \\ -\sin(\theta + \alpha) & \cos(\theta + \alpha) & 0 \\ 0 & 0 & 1 \end{bmatrix}$$

Where as shown in FIG. 8, (x, y), $\theta$, (x, y, $\theta$), W and $\theta + \alpha$ are the coordinates of the reference point R of the vehicle, the angle between the direction V and the x-axis, the homogenous coordinate representation of the position and heading of the vehicle, the distance between the reference point R of the vehicle and the camera center $O_c$, and the angle between the l-axis (an optical axis of the TV camera) and the x-axis, respectively.

Also the transformation matrix from the l-m coordinate system to the x-y coordinate system is expressed by matrix $T_1^{-1}$.

On the other hand, the transformation matrix $T_2$ from the l-m coordinate system to the p-q coordinate system is expressed by matrix products of a mapping matrix $M_3$ from the l-m coordinate system to the p-q coordinate system, a real distance transformation matrix $M_4$ and a coordinate axis transformation matrix $M_5$ in the p-q coordinate system as the following equation.

$$T_2 = M_3 \cdot M_4 \cdot M_5 \quad (3)$$

The matrices $M_3$, $M_4$ and $M_5$ are represented by $$M_3 = \begin{bmatrix} 1 & 0 & 0 \\ 0 & \sin t & (\cos t)/f \\ 0 & h \cdot \cos t & (h \cdot \cos t)/f + 1 \end{bmatrix}$$

-continued $$M_4 = \begin{bmatrix} s & 0 & 0 \\ 0 & s & 0 \\ 0 & 0 & 1 \end{bmatrix}$$

$$M_5 = \begin{bmatrix} 0 & -1 & 0 \\ 1 & 0 & 0 \\ d_p & d_q & 1 \end{bmatrix}$$

where t, h and f are the tilt angle of the camera formed between the l-axis and the x-y plane, the height of the camera center $O_c$ from the x-y plane and the focal length of the camera, respectively.

The symbol s is defined by $s = d_p/r_p = d_q/r_q$.

The symbol $d_p$, $d_q$ are the pixel numbers in the p and q directions on the input image plane, respectively, and $r_p$ and $r_q$ are the actual distances corresponding to the numbers $d_p$ and $d_q$ on the input image plane, respectively.

The device of the embodiment comprises image input means 1, edge segment extracting means 2, guide sign searching means 3, vehicle position/heading calculating means 4, guide sign storage means 5, position/heading measuring means 6, position/heading integrating means 7, tilt angle calibration means 81, position/heading forecast means 9, traveling course storage means 100, traveling control means 200, and driving means 300.

Guide Sign Storage Means

The guide sign storage means 5 previously stores guide sign data of a start point position ($gxs_i$, $gys_i$), an end point position ($gxe_i$, $gye_i$) and a grey edge direction in the x-y coordinate system of each of a plurality (i = 1 – n) of standard guide signs being grey edge segments and indices for detecting the position and heading of the vehicle. Also the guide sign storage means 5 previously stores guide sign data of an end point or intersection point ($gxc_j$, $gyc_j$) of each of a plurality (j = 1 – m) of the standard guide signs. In the hereinafter description, a segment is written using coordinates of a start point and an end point in (start point coordinates)-(end point coordinates).

Image Input Means

Figure 12:
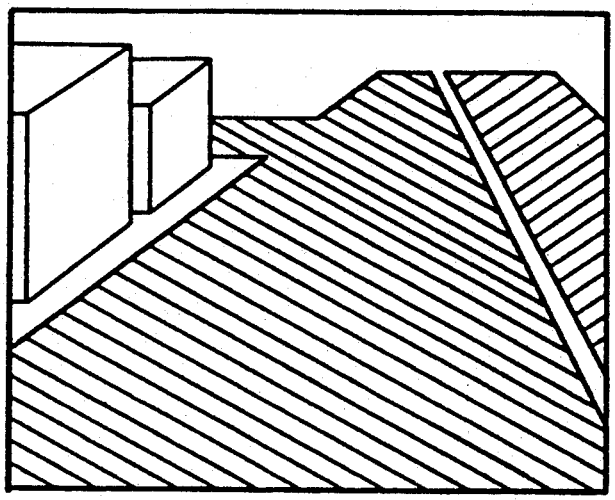

The image input means 1 comprises a TV camera 11 for inputting the image of outer environment at the front side of the vehicle, an amplifier 12 for amplifying a video signal, an A/D converter 13 for performing analog to digital conversion (hereinafter referred to as "A/D conversion") of the amplified video signal, and a frame memory 14 for storing an image F as shown in FIG. 12 after the A/D conversion. The TV camera starts to input the image of the outer environment at the timing $t_s$ shown in FIG. 24.

Edge Segment Extracting Means

Figure 13:
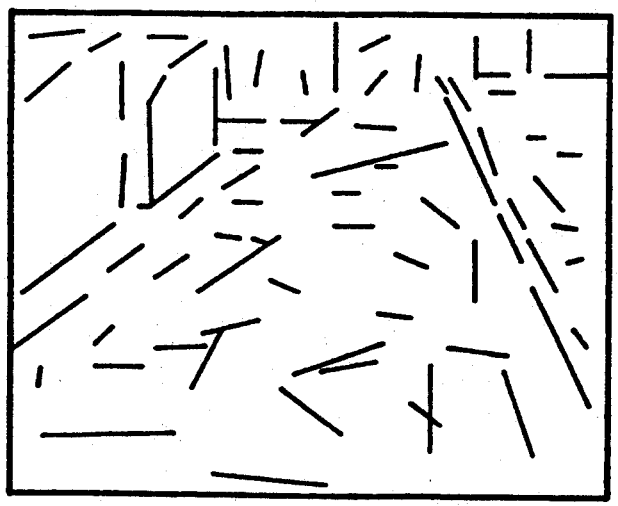

The edge segment extracting means 2 comprises a Sobel operator circuit 21, an edge intensity operation circuit 22, a gradient operation circuit 23, a ridge extracting circuit 24, and an edge segment searching circuit 25. The Sobel operator circuit 21 has circuits for the horizontal and vertical directions, and calculates differential images Fsh, Fsv in the horizontal direction and the vertical direction respectively based on the input image F outputted from the frame memory 14 and outputs the operation result. The edge intensity operation circuit 22 calculates an edge intensity image Fi based on the differential images Fsh, Fsv outputted by the Sobel operator circuit 21. The gradient operation circuit 23 calculates a gradient image Fg based on the differential images Fsh, Fsv outputted by the Sobel operator circuit 21. The ridge extracting circuit 24 outputs a ridge image Fs based on the edge intensity image Fi outputted by the edge intensity operation circuit 22 and the gradient image Fg outputted by the gradient operation circuit 23. The edge segment searching circuit 25 extracts the grey edge segments as shown in FIG. 13 from the image F based on the edge intensity image Fi outputted by the edge intensity operation circuit 22, the gradient image Fg outputted by the gradient operation circuit 23 and the ridge image Fs outputted by the ridge operation circuit 24, and outputs list data L constituted by a start point (Sps$_k$, Sqs$_k$) and an end point (Spe$_k$, Sqe$_k$), a length l$_k$ and a gradient Sgr$_k$ for each of a plurality of segments (k=1−o) shown in FIG. 13.

Guide Sign Searching Means

The guide sign searching means 3 comprises a clustering circuit 31, a selecting circuit 32, a plural guide signs matching decision circuit 33, and an edge segment limiting circuit 34.

Figure 14:
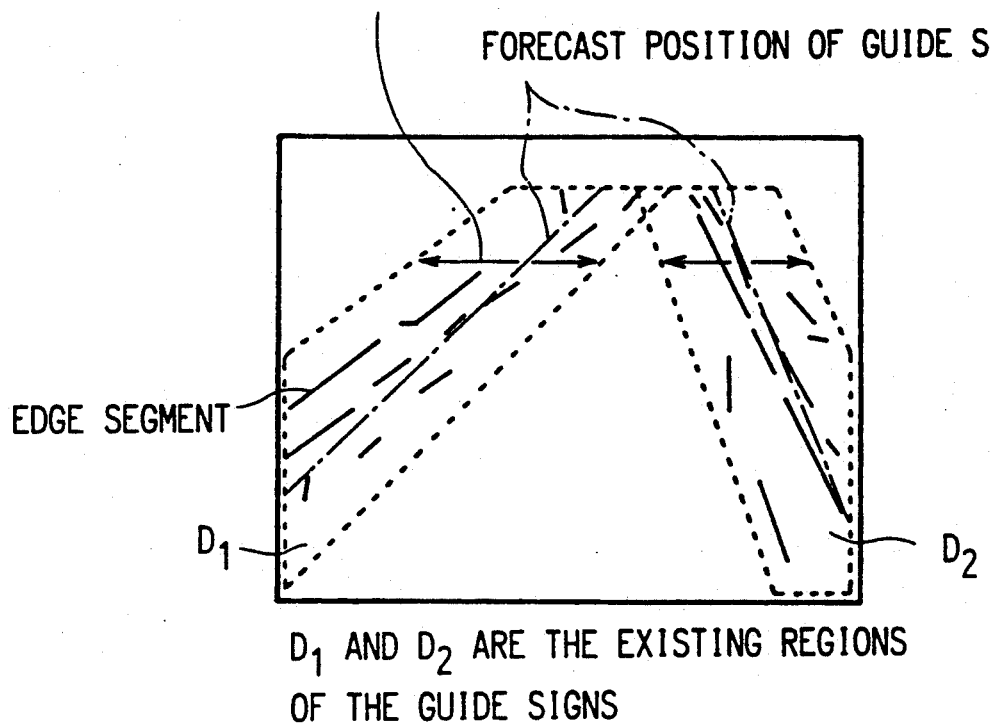

In the edge segment limiting circuit 34, the forecasted position and heading (xb, yb, θb) of the vehicle at the image input time of the image F and error values thereof (dxb, dyb dθb), which are stored in position/heading forecast means 9 hereinafter described, as well as the guide sign data (gxs$_i$, gys$_i$)-(gxe$_i$, gye$_i$) and ggr$_i$ in the x-y coordinate system stored in the guide sign storage means 5 are inputted. In the edge segment limiting circuit 34, at which position on the image input plane the respective standard guide signs exist when the vehicle takes the forecasted position and heading (xb, yb, θb), can be determined by the coordinate transformation in accordance with the equation (1). However because the forecasted position and heading (xb, yb, θb) includes the error (dxb, dyb, dθb), the position at which the guide sign exists on the image input plane is in a region determined by the forecast error. Accordingly, in the circuit 34, by similar operation in accordance with the equation (1) from the error values (dxb, dyb, dθb) of the forecasted position and heading, the existing regions D$_1$, D$_2$ shown in FIG. 14 of the respective guide signs can be calculated as respective window regions on the image input plane. Also in the circuit 34, the edge segments represented by list data L are inputted from the edge segment extracting means 2, and it is investigated whether each of plural edge segments is included in the respective window region of the respective guide sign or not, whereby the edge segments being not included in the window regions are deleted from the list data L. The edge segments represented by the deleted list data L are shown in FIG. 14.

The clustering circuit 31 inputs the list data L for the edge segments limited by the edge segment limiting circuit 34, and calculates the distance u between any two segments of the edge segments for the respective edge segment. The distance between the edge segments is defined as a length of the perpendicular when a line including one edge segment is perpendicularly projected onto the other segment. In this case, any one is selected from the plural perpendiculars brought down from both ends or the middle point of the projecting segment. Since this distance represents degree of the alignment property between the respective edge segments, reciprocal of this distance is set as degree of similarity in the clustering processing. The edge segments with large similarity are gathered with each other so as to construct one cluster by comparing and distributing (clustering) the edge segments with each other. A respective longer edge segment represented by the start point (Sps$_l$, Sqs$_l$) and the end point (Spe$_l$, Sqe$_l$) in the p-q coordinate system is determined by the respective least square segment for a respective set of the edge segments belonging to the respective cluster. Also the total amount ls$_l$ of respective length of the edge segments to constitute any one longer edge segment is calculated and outputted. This calculation is performed for each cluster to obtain plural longer edge segments, shown in FIG. 15.

In the selecting circuit 32, the longer edge segments (Sps$_l$, Sqs$_l$)-(Spe$_l$, Sqe$_l$) outputted by the clustering means 31 are inputted. In the selecting circuit 32, based on the forecasted position and heading (xb, yb, θb) of the vehicle at the image input time inputted from the position/heading forecast means 9 as hereinafter described and the standard guide signs (gxs$_i$, gys$_i$)-(gxe$_i$, gye$_i$) represented in the x-y coordinate system stored in the guide sign storage means 5, the forecast position (gps$_i$, gqs$_i$)-(gpe$_i$, gqe$_i$) of the respective guide sign on the image input plane is calculated by the coordinate transformation in accordance with the equation (1). Also respective distance z between the respective guide sign mapped on the image input plane and the respective longer edge segment (Sps$_l$, Sqs$_l$)-(Spe$_l$, Sqe$_l$) outputted from the clustering circuit 31 is calculated. For the respective longer edge segment, based on the distance value z, the length total amount ls$_l$ outputted from the clustering circuit 31 and the matching value mt outputted from a matching decision circuit 33, for example, as expressed by the following equation (4), the respective evaluation function value is calculated. The evaluation function takes a large value when the distance value z is small, the length total amount ls$_l$ is large and the matching value mt is large. For all standard guide signs, the respective specific longer edge segment corresponding to each of the guide signs which has the largest evaluation value E is selected from all of the longer edge segments.

The specific longer edge segment which has the largest evaluation value E is best matched with the corresponding standard guide sign. Accordingly hereinafter the longer edge segment is refered to as the extracted longer edge segment in comparison with the corresponding standard guide sign.

$$E = \frac{1}{a \cdot z + \frac{b}{ls_l} + \frac{c}{mt}} \quad (4)$$

Where the constants a, b and c i.e. degree of contribution to value E, are set in response to environment condition of the traveling area.

When the selecting circuit 32 outputs any longer edge segments corresponding to the number of the guide signs into the matching decision circuit 33, the circuit 33 operates the position/heading calculating means 4 to receive the respective estimated position and heading of the vehicle calculated from the respective longer edge segments by the edge segment reference position/heading calculating means 41.

The matching decision circuit 33 calculates the scattering value (e.g., standard deviation) among the estimated position and headings of the vehicle.

The reciprocal of the scattering value is outputted as matching value mt from the circuit 33. That is, the matching value mt is inversely proportional to the scattering value among the estimated position and headings of the vehicle, and represents degree of the matching in a respective set of selected longer edge segments. When the matching value is less than the predetermined threshold value, that is, the matching cannot be taken in a set of longer edge segments, decision is effected in which combination of the selected longer edge segments is wrong. Combination of the longer edge segments capable of being matched and combination of the longer edge segments capable of not being matched among various combinations is outputted to the selecting circuit 32.

Vehicle Position/heading Calculating Means

The vehicle position/heading calculating means 4 comprises edge segment reference position/heading operation means 41, point reference position/heading operation means 42, and averaging means 43.

In the edge segment reference position/heading operation means 41, the coordinate transformation operator defined by the equation (5) is applied to the respective extracted longer edge segment $(Sps_i, Sqs_i)-(Spe_i, Sqe_i)$ outputted from the selecting circuit 32, being expressed in the p-q coordinate system corresponding to the respective standard guide sign. The heading estimate value $\theta g_i$ of the extracted longer edge segment and the distance $d_i$ of the extracted longer edge segment to the reference point R of the vehicle in the l-m coordinate system are calculated without collating the end point of the extracted longer edge segment with the end point of the standard guide sign. Also the respective error value, being experimentally decided in accordance with resolution of the TV camera, for the respective extracted longer edge segment $(Sps_i, Sqs_i)-(Spe_i, Sqe_i)$ on the input image plane is transformed to the respective error value in the l-m coordinates.

$$U = T_2^{-1} \quad (5)$$

Where $T_2$ is expressed by equation (3).

The point reference position/heading operation means 42 applies the coordinate transformation operator by the equation (5) to the end point or intersection $(Spc_j, Sqc_j)$ of the extracted longer edge segment $(Sps_i, Sqs_i)-(Spe_i, Sqe_i)$ represented in the p-q coordinate system corresponding to each standard guide sign outputted from the selecting circuit 32. Thereby the position $(Slc_j, Smc_j)$ of the end point or intersection in the l-m coordinate system is calculated. Also the respective error value, being experimentally decided in accordance with resolution of the TV camera, for the extracted end point or the intersection of the respective extracted longer edge segment in the p-q coordinate system is transformed to get the respective error value in the l-m coordinate system by the operator of the equation (5). Both error values transformed are outputted into the averaging means 43.

In the averaging means 43, the forecasted position and heading $(xb, yb, \theta b)$ of the vehicle at the image input time inputted from the position/heading forecast means 9, the respective estimated heading value $\theta g_i$ and distance $d_i$ of the respective extracted longer edge segment and error values of those values in the l-m coordinate system outputted by the edge segment reference position/heading operation means 41, the position of the standard guide sign $(gxs_i, gys_i) - (gxe_i, gye_i)$ represented in the x-y coordinate system stored in the guide sign storage means 5 corresponding to the extracted longer edge segment, relative position $(Slc_j, Smc_j)$ of the end point or intersection and error value thereof in the l-m coordinate system outputted by the point reference position/heading operation means 42, and the end point or intersection position $(gxc_j, gyc_j)$ of the standard guide sign represented in the x-y coordinate system stored in the guide sign storage means 5 corresponding to the extracted longer edge segment are entered.

The respective absolute estimated position and heading at the image input time is calculated using those data, for the respective extracted longer edge segment. Where in case that in relative position between the vehicle and the extracted longer edge segment, a parallel component with respect to the extracted longer edge segment can not be calculated, the component is calculated from the forecasted position and heading at the image input time.

Next a mean value is calculated among the absolute estimated position and heading as follows.

Any one variable and error thereof of the absolute estimated position and heading of the vehicle are defined as A and dA, in the x-y coordinate system respectively.

Also the respective variables and errors thereof corresponding to the respective standard guide signs $SG_1$, $SG_2$, ... are defined as $A_1, A_2, \ldots$ and $dA_1, dA_2, \ldots$, respectively. In case that the number of the standard guide signs is two, the variable A and the error dA are given by the following equations (6), (7).

$$A = \frac{A_1 \cdot dA_2^2 + A_2 \cdot dA_1^2}{dA_1^2 + dA_2^2} \quad (6)$$

$$dA = \frac{dA_1 \cdot dA_2}{(dA_1^2 + dA_2^2)^{\frac{1}{2}}} \quad (7)$$

Where A is $xv$, $yv$ or $\theta v$ and dA is $dxv$, $dyv$ or $d\theta v$. $A_1$ is $xv_1$, $yv_1$ or $\theta v_1$ and $A_2$ is $xv_2$, $yv_2$ or $\theta v_2$. $dA_1$ is $dxv_1$, $dyv_1$ or $d\theta v_1$ and $dA_2$ is $dxv_2$, $dyv_2$ or $d\theta v_2$.

The equation (6) means that, for example, when $A = xv$, $xv$ is calculated as weighted mean for two values $xv_1$, $xv_2$ obtained from the extracted longer edge segments, weight factors being inverse square errors $1/dxv_1^2$, $1/dxv_2^2$.

The equation (7) means that when dA is $dxv$, error $dxv_1$ is calculated as the reciprocal of the root mean square sum of resiprocal of each error $dxv_1$, $dxv_2$ obtained for each extracted longer edge segment.

An estimated position and heading of the vehicle with a smaller error calculated from one of the extracted longer edge segments more contributes to the averaged estimated position and heading of the vehicle. On the contrary, an estimated position and heading of the vehicle with a larger error less contributes to the averaged estimated position and heading.

Camera Parameter Calibration Means

The respective extracted longer edge segments $(Sps_i, Sqs_i) - (Spe_i, Sqe_i)$ extracted by the selecting circuit 32 is inputted to tilt angle calibration means 81 as the camera calibration means 8. When under condition that a plurality of guide signs are seen on the image input plane, evaluation value calculated by position/heading reliability evaluation means 74 hereinafter described exceeds a previously set threshold value, that is, it is judged that the estimated position and heading have a high reliability, the tilt angle calibration means 81 starts the vehicle position/heading calculating means 4 to determine the respective heading of the vehicle for the respective extracted longer edge segment. Then in the correcting means 81, compensation value te of tilt angle is decided so that the scattering value among the calculated headings of the vehicle becomes small. The value of tilt angle t used in the coordinate transformation operation of the guide sign searching means 3 and the vehicle position/heading calculating means 4 is compensated for the value te.

Position/heading Integrating Means

The position/heading integrating means 7 comprises a memory 71, an operation circuit 72, a synchronous circuit 73, position/heading reliability evaluation means 74, and speed control means 75.

The respective evaluation value E for the respective extracted longer edge segment decided by the selecting circuit 32 is inputted to the position/heading reliability evaluation means 74. The respective evaluation value E is normalized by the maximum value among these values. An arithmetic mean for the normalized values is outputted as an evaluation value c of reliability. Namely the selecting circuit 32 decides the respective extracted longer edge segment with the largest evaluation value E corresponding to the respective standard guide sign. The respective value E represents the degree of reliability of the respective extraction, because the respective value E is calculated in accordance with the distance z between the respective standard guide sign mapped on the image input plane and the respective extracted longer edge segment, the total amount $sl_1$ of length of the edge segments to constitute the respective extracted longer edge segment, and the matching value mt obtained from the matching decision circuit 33. Consequently, the evaluation value c becomes evaluation value for the averaged estimated position and heading calculated by the vehicle position/heading calculating means 4.

In the speed control means 75, based on the reliability evaluation value c outputted by the position/heading reliability evaluation means 74, decision is effected as to whether the measuring of position and heading of the vehicle is true or not. If the estimation is not true, traveling control means 200 hereinafter described is controlled by the control means 75 so that the traveling speed of the vehicle is held or decreased.

The memory 71 stores a current position and heading (x, y, $\theta$) of the vehicle as a supervising value in the guiding device and error values thereof. The current position and heading is renewed by the respective calculation value by the integrating means 7 and the measuring means 6 every respective timing $t_1, t_2, \ldots, t_s, t_e$ as shown in FIG. 24.

The operation circuit 72 calculates image input time calibrated position and heading ($x_m$, $y_m$, $\theta_m$) which is the weighted mean value of the image input time estimated position and heading (xv, yv, $\theta$v) obtained by the image processing and the image input time forecasted position and heading (xb, yb, $\theta$b) having been obtained by counting rotation number of measuring wheels 61R, 61L.

In the average calculation, the weighted mean by the equation (6) is used. And the equation (7) is used for the error estimation. Where in the equations (6), (7), A=$x_m$, $y_m$ or $\theta_m$, $A_1$=xv, yv or $\theta$v, $A_2$=xb, yb or $\theta$b, $dA_1$=dxv/c, dyv/c or d$\theta$v/c, $dA_2$=dxb, dyb or d$\theta$b.

Figure 24:
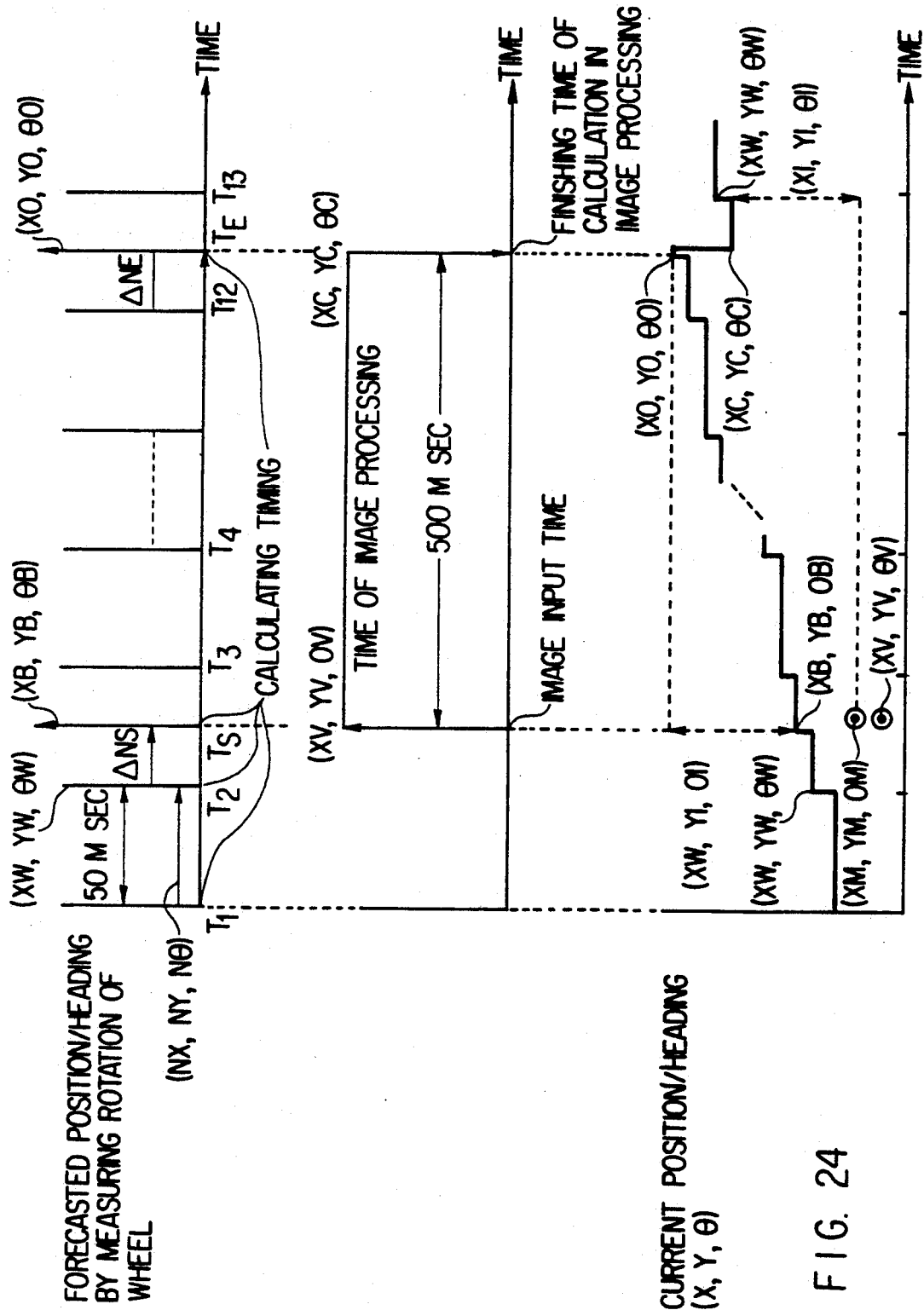
FIG. 24 is a timing chart showing executing timing in the embodiment.

The synchronous circuit 73 outputs a timing signal for compensating the current position and heading into an operation circuit 63 of the measuring means 6 in response to the output from the averaging means 43 at the timing $t_e$ shown in FIG. 24. In response to the timing signal, the operation circuit 63 reads the current position and heading from the memory 71 to add the displacement $\Delta$ne to the current position and heading, the displacement $\Delta$ne being counted by counter circuits 62R, 62L in the period form the last measuring timing $t_{12}$ till the timing $t_e$ as shown in FIG. 24. The current position and heading compensated for the displacement is outputted into the calculating circuit 72 to be stored into the memory 71. The current position and heading at the timing $t_e$ is referred to as the current forecasted position and heading (xo, yo, $\theta$o). At the time the operation circuit 63 has finished the compensation, it resets a value i.e. the displacement counted by the counter circuits 62R, 62L, to restart counting up for detecting following displacement.

Figure 26:
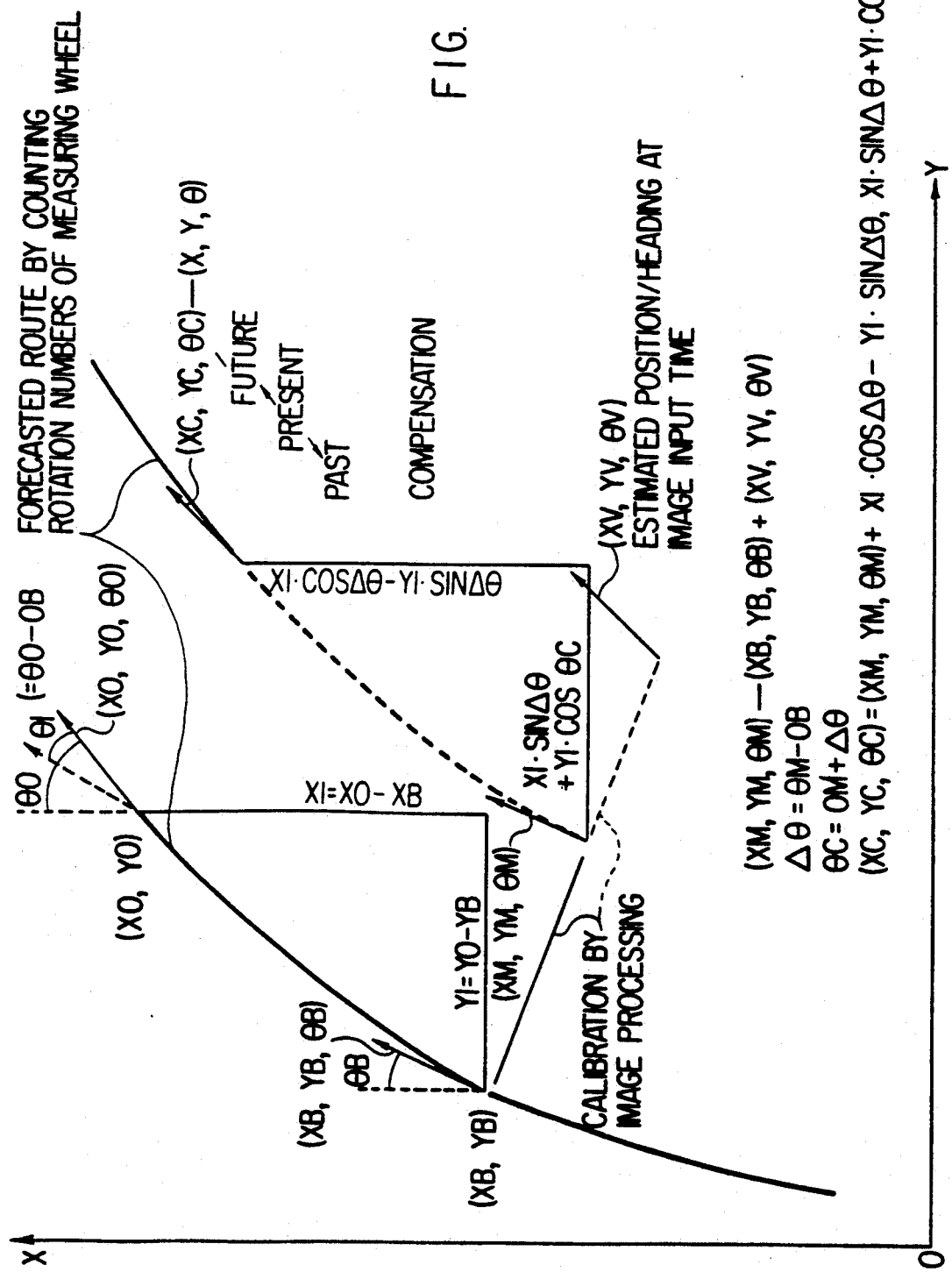
FIG. 26 is a chart showing a compensation process of a position and heading in the embodiment.

The operation circuit 72 inputs the image input time averaged estimated position and heading (xv, yv, $\theta$v) from the vehicle position/heading calculating means 4, and also inputs the image input time forecasted position and heading (xb, yb, $\theta$b) held by the position/heading forecast means 9 hereinafter described. Compensation of the current position and heading shown in FIG. 26 is executed as follows. Difference (x1, y1, $\theta$1) is calculated between the current forecasted position and heading (xo, yo, $\theta$o) just compensated and the image input time forecasted position and heating (xb, yb, $\theta$b) as shown in FIG. 26. The difference (x1, y1, $\theta$1) is added to the image input time calibrated position and heading (xm, ym, $\theta$m) to produce a current compensated position and heading (xc, yc, $\theta$c) by the following equation.

$$xc = xm + xl \cdot \cos\Delta\theta - yl \cdot \sin\Delta\theta \quad (8)$$

$$yc = ym + xl \cdot \sin\Delta\theta + yl \cos\theta c \quad (9)$$

$$\theta c = \theta m + \Delta\theta \quad (10)$$

$$\Delta\theta = \theta m - \theta b \quad (11)$$

The current compensated position and heading (xc, yc, $\theta$c) is stored into the memory 71 as a new current position and heading (x, y, $\theta$). In this way the current position and heading is compensated by the estimated position and heading calculated by the image processing.

Position/heading Forecast Means

The position/heading forecast means 9 outputs a timing signal for compensating the position and heading at the image input time $t_s$ shown in FIG. 24 into an operation circuit 63 of the measuring means 6 in response to an image input start signal from the TV camera 11. In response to the timing signal, the operation circuit 63 reads the current position and heading from the memory 71 to add the displacement $\Delta$ns to the current position and heading, the displacement $\Delta$ns being counted by counter circuits 62R, 62L. The current position and heading compensated for the displacement is outputted into the calculating circuit 72 to be stored into the memory 71. At the time the operation circuit 63 has finished the compensation, it resets a value i.e. the displacement counted by the counter circuits 62R, 62L, to restart counting up for detecting following displacement. Further at the image input time $t_s$, the forecast means 9 reads the just renewed position and heading (x, y, $\theta$) from the memory 71 with the error values thereof, to store and hold the data as the forecasted position and heading (xb, yb, $\theta$b) at the image input time and the error values thereof (dxb, dyb, d$\theta$b).

Position/heading Measuring Means

The position/heading measuring means 6 comprises lateral independent measuring wheels 61R, 61L, independent counter circuits 62R, 62L for counting the rotation number in definite time of each measuring wheel, and the operation circuit 63.

In the operation circuit 63, based on the displacement of position and heading (nx, ny, n$\theta$) obtained from the count value of each counter circuit 62R, 62L, error values thereof (dnx, dry, dn$\theta$) previously experimentally estimated, and the current position and heading (x, y, $\theta$) of the vehicle stored in the memory 71 of the position/heading integrating means 7 and the error values thereof (dxb, dyb, d$\theta$b), the forecasted current position and heading (xw, yw, $\theta$w) of the vehicle in the x-y coordinate system and the error values thereof (dxw, dyw, d$\theta$w) are calculated by the following equations (12), (13).

$$(xw, yw, \theta w) = (x, y, \theta) + (nx, ny, n\theta) \quad (12)$$

$$\begin{bmatrix} dxw \\ dyw \\ d\theta w \end{bmatrix} = \begin{bmatrix} (dx^2 + dnx^2)^{\frac{1}{2}} \\ (dy^2 + dny^2)^{\frac{1}{2}} \\ (d\theta^2 + dn\theta^2)^{\frac{1}{2}} \end{bmatrix} \quad (13)$$

That is, the position/heading measuring means 6 calculates the displacement of the position and heading of the vehicle in the definite time, and outputs the forecasted current position and heading (xw, yw, $\theta$w) in the coordinate system on the present traveling plane and the error values thereof (dxw, dyw, d$\theta$w). The position/heading measuring means 6 periodically repeats the calculation described above in a predetermined interval 50 m sec as shown in FIG. 24. And also the measuring means 6 executes the calculation described above in response to the respective timing signal inputted from the synchronous circuit 73 and the position/heading forecast means 9 at the timing $t_s$ and $t_e$ as described above. The forecasted current position and heading (xw, yw, $\theta$w) and the error values thereof (dxw, dyw, d$\theta$w) are stored in the memory 71 as the current position and heading (x, y, $\theta$) and the error values thereof (dx, dy, d$\theta$).

Traveling Course Storage Means

Traveling course storage means 100 previously stores the traveling parameters necessary for the traveling in the determined target course, comprising sort of operation of the vehicle, shape value of the target course and the target traveling speed.

Traveling Control Means

Traveling control means 200 comprises an acceleration operation circuit 201 and an integration circuit 202. In the acceleration operation circuit 201, based on the current compensated position and heading (x, y, $\theta$) of the vehicle in the x-y coordinate system outputted by the position/heading integrating means 7 and the traveling parameters stored in the traveling course storage means 100, acceleration values (aR, aL) of lateral drive wheels (not shown) required for the traveling on the target traveling course at the target speed are calculated. The acceleration values are integrated in the integration circuit 202, and the rotational speeds (vR, vL) being the actual drive amount of the lateral drive wheels are calculated.

Drive Means

Drive means 300 comprises a drive mechanism 303 including a clutch, a gear and drive wheels, a motor 302 for rotating and driving the drive mechanism 303, and a servo circuit 301 for controlling the rotation of the motor 302 based on the drive amount (vR, vL) outputted from the traveling control means 200.

Operation of the Device

Figure 11:
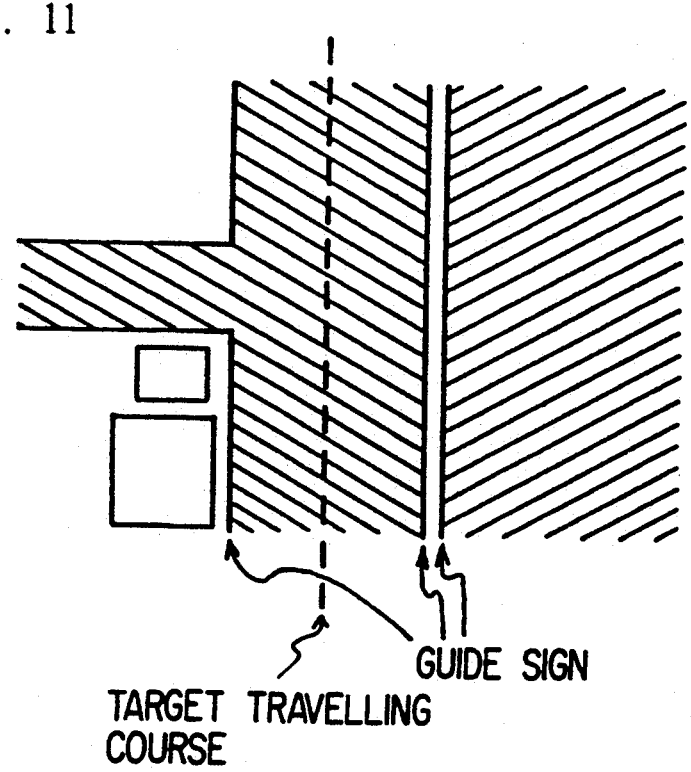
FIGS. 11 through 19 are diagrams showing extracting processes of guide signs in the embodiment.

Next, operation of the embodiment will be described. FIG. 11 shows a part of the traveling location of the self controlled vehicle as a plan view. FIG. 11 shows state that regions are classified by color corresponding to respective purposes to be painted. A center passage with a left side bending portion is a traveling road of the vehicle. A traveling course of the vehicle is along an imaginary dotted line set at the center. The traveling course is represented by necessary parameters such as position in the x-y coordinate system. These parameters are previously stored as data representing the traveling course in the traveling course storage means 100.

The guide sign is a general grey edge line. In FIG. 11, the guide signs are three lines, a boundary line at the left side of the traveling region of the vehicle and two boundary lines on both sides of a white line of the boundary at the right side. Positions of the start point and the end point of each boundary line and direction of the grey edge in the x-y coordinates system are stored previously as the standard guide signs in the guide sign storage means 5.

During the traveling, while the current position and heading of the vehicle at every moment are determined by the device of the embodiment, the traveling control along the given traveling course is performed. In the position/heading integrating means 7 the image input time position and heading is determined by averaging the image input time forecasted position and heading and the image input time estimated position and heading outputted, respectively, from the position/heading forecast means 9 and the vehicle position/heading calculating means 4.

STEP 1 in FIG. 25

When the vehicle travels along the traveling course, the position/heading measuring means 6 measures rotation number in a definite time as shown in FIG. 24 (i.e., measuring period) of measuring wheels 61R, 61L respectively installed independently and coaxially with the lateral drive wheels by the counter circuits 62R, 62L respectively. At a constant period (50 m sec) as shown in FIG. 24, the means 6 calculates the forecasted position and heading (xw, yw, $\theta$w) and error values thereof based on the equations (12), (13) to output the values into the position/heading integrating means 7. The position/heading integrating means 7 stores the values as the new current position and heading (x, y, θ) and new error values in the memory 71. If the position compensation by the input image is not performed but update of the value of position and heading by the position/heading measuring means 6 is repeated, the error values of position and heading increase. During the traveling, the measuring of position and heading by the position/heading measuring means 6 is performed at high frequency (50 m sec).

STEP 2 in FIG. 25

In the calculation of the position and heading based on the input image, first, the image F of the front view of the vehicle is inputted via the TV camera 11 of the image input means 1. The video signal outputted from the TV camera 11 is amplified by the amplifier 12 and subjected to the A/D conversion by the A/D converter 13. The A/D converted value is stored in the frame memory 14. The input image F of the traveling plane of FIG. 11 is obtained as shown in FIG. 12.

The position/heading forecast means 9 outputs the timing signal to the operation circuit 63 at the image input time $t_s$ in FIG. 24 of the TV camera 11. In synchronization with this signal, the image input time forecasted position and heading (xb, yb, θb) calculated by the operation circuit 63 of the position/heading measuring means 6 from the current position and heading (x, y, θ) and the present count value Δns by the equation (12) are outputted to the position/heading bending means 7. In the position/heading integrating means 7, the current position and heading (x, y, θ) in the memory 71 is renewed by the forecasted position and heading (xb, yb, θb).

By such a way, the exact values of position and heating at the image input time are determined by the position/heading measuring means 6. According to this operation, even if the measuring time of the position/-heading measuring means 6 and the image input time are different, the exact position and heading at the image input time can be calculated.

STEP 3 in FIG. 25

The edge segment extracting means 2 inputs the image F shown in FIG. 12 and extracts the gray edges segment, and output the list data L thereof (shown as image in FIG. 13). Since the input image data with much information is converted into the list data regarding the edge segments, searching for the guide sign at the rear stage can be performed at high speed. In the edge segments extracted in this case, under actual environment, the segment corresponding to the guide signs becomes broken due to contamination or unevenness of the traveling plane and the illuminating condition, and many other noise segments may be mixed therein.

In the edge segment limiting circuit 34 of the guide sign searching means 3, the forecasted position and heading of the vehicle at the image input time from the position/heading forecast means 9, and data of the start point position ($gxs_i$, $gys_i$), the end point position ($gxe_i$, $gye_i$) and the direction of grey edge $ggr_i$ in the x-y coordinate system of the standard guide signs stored in the guide sign storage means 5 are inputted. The edge segment limiting circuit 34 determines to which position on the input image plane is seen each standard guide sign from the forecasted position and heading (xb, yb, θb) of the vehicle, by the coordinate transformation of the equation (1). Also from the error values of the forecasted position and heading of the vehicle at the image input time, by similar calculation, the existing region (window region) and the directional angle of each standard guide sign mapped on the image input plane are calculated. The existing regions $D_1$, $D_2$ are shown by the inside area of dotted line in FIG. 14. The circuit 34 inputs the edge segment of FIG. 13 from the edge segment searching circuit 25, and investigates whether the respective segments are included in the existing region of the standard guide sign and an angular range determined by the directional angle of the standard guide sign or not. Thereby the circuit 34 deletes the edge segments not included in these regions and angular range, and outputs the segments as shown in FIG. 14. Since unnecessary edge segments are deleted effectively, the processing speed at the rear stage can be improved and the operation can be free from error due to the mixing of unnecessary data.

Figure 21:
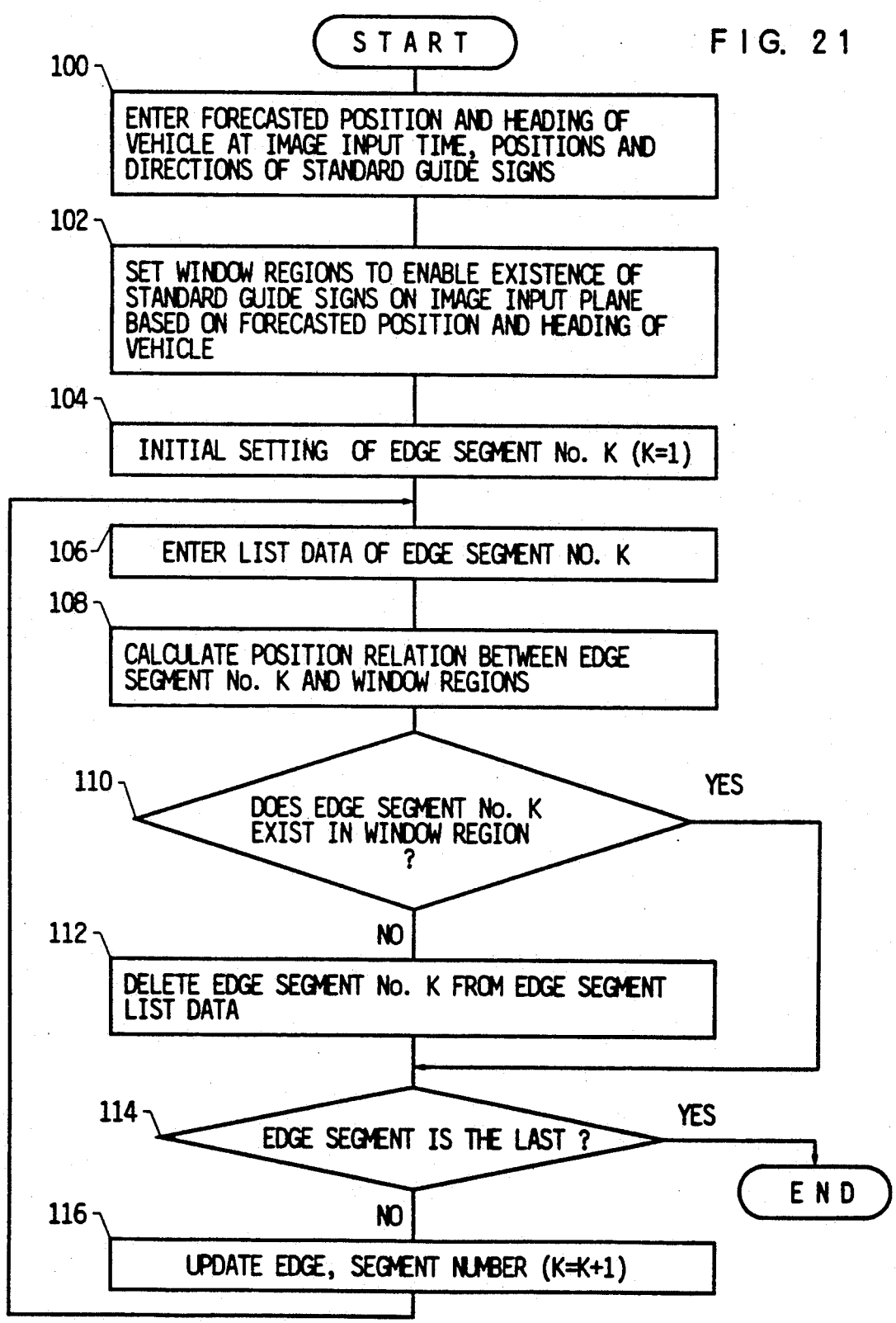
FIGS. 21 through 23 are flow charts showing processing procedures in the embodiment.

The above-mentioned processing of the edge segment limiting circuit 34 is executed specifically in accordance with a flow chart flow chart of FIG. 21.

In step 100, the forecasted position and heating of the vehicle at the image input time are inputted from the position/heading forecast means 9. Also positions and directions of the standard guide signs corresponding to location of outer environment at the image input time are inputted from the guide sign storage means 5.

In next step 102, based on the forecasted position and heading of the vehicle, the window region to enable existence of the standard guide sign is set on the image input plane. That is, the coordinate transformation processing of equation (1) is executed, whereby the existing position and direction of the standard guide signs on the image input plane are determined. The respective window regions to enable existence of the standard guide signs are set for the respective standard guide sign mapped onto the image input plane considering definite error.

Next in step 104, edge segment No. K of a decision object is set to one of initial values.

Next in step 106, the edge segment list data of No. K is inputted from the edge segment searching circuit 25.

Next in step 108, the relative position relation between the position and heading of the edge segment of No. K and the window regions is calculated.

Next in step 110, from the calculation result, a decision is made as to whether the edge segment of No. K exists in the window regions or not.

If the edge segment of No. K does not exist in the window regions, in step 112, the edge segment of No. K is deleted from the edge segment list data.

Also in step 114, a decision is made as to whether the edge segment of the decision object is the last of the list data or not. If not the last one, in step 116, the edge segment of No. K of the decision object is added by 1 to be updated.

Then the process returns to step 106, and similar processing is executed on the next edge segment.

On the other hand, in step 110, if the edge segment of No. K exists in the window regions, the edge segment is not deleted from the list data, jumping to step 114.

Also in step 114, if the edge segment of the decision object is the last edge segment among the list data, the present program is finished.

Figure 15:
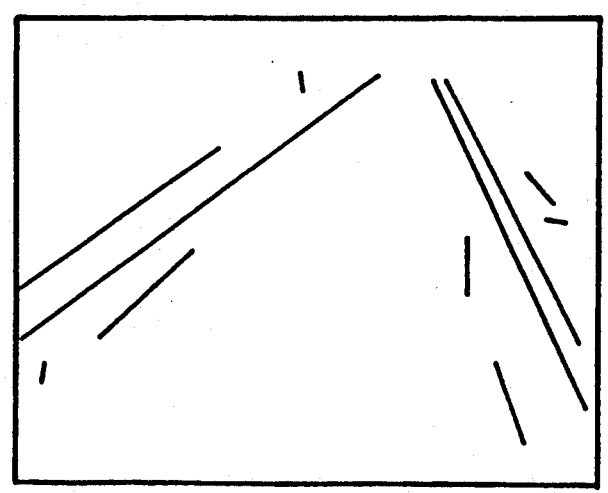

The clustering circuit 31 inputs the edge segment extracted as shown in FIG. 14 as the list data L, and sets reciprocal of the distance between any two segments as similarity of the clustering. The circuit 31 applies the clustering processing to each edge segment, whereby edge segments included in the same line are gathered as one cluster. The least square segment approximating the gathered segments is determined. The least square segment becomes one longer edge segment represented as (Sps$_l$, Sqe$_l$)-(Spe$_l$, Sqe$_l$) in the p-q coordinate system as shown in FIG. 15. The total amount ls$_1$ of length of the edge segments to constitute the longer edge segment is calculated. Data of the longer edge segment and the total amount are outputted. In the edge segment outputted from the edge segment extracting means 2, the segments corresponding to the standard guide sign existing part become broken segments under actual environment. However, according to the clustering process by the clustering circuit 3, the edge segments are reproduced respectively as one longer edge segment for the respective cluster. Also the total amount ls$_1$ of length relating to the longer edge segment represents degree of extraction of the longer edge segment, and may be made one of indices selecting the longer edge segment corresponding to the standard guide sign.

Figure 22:
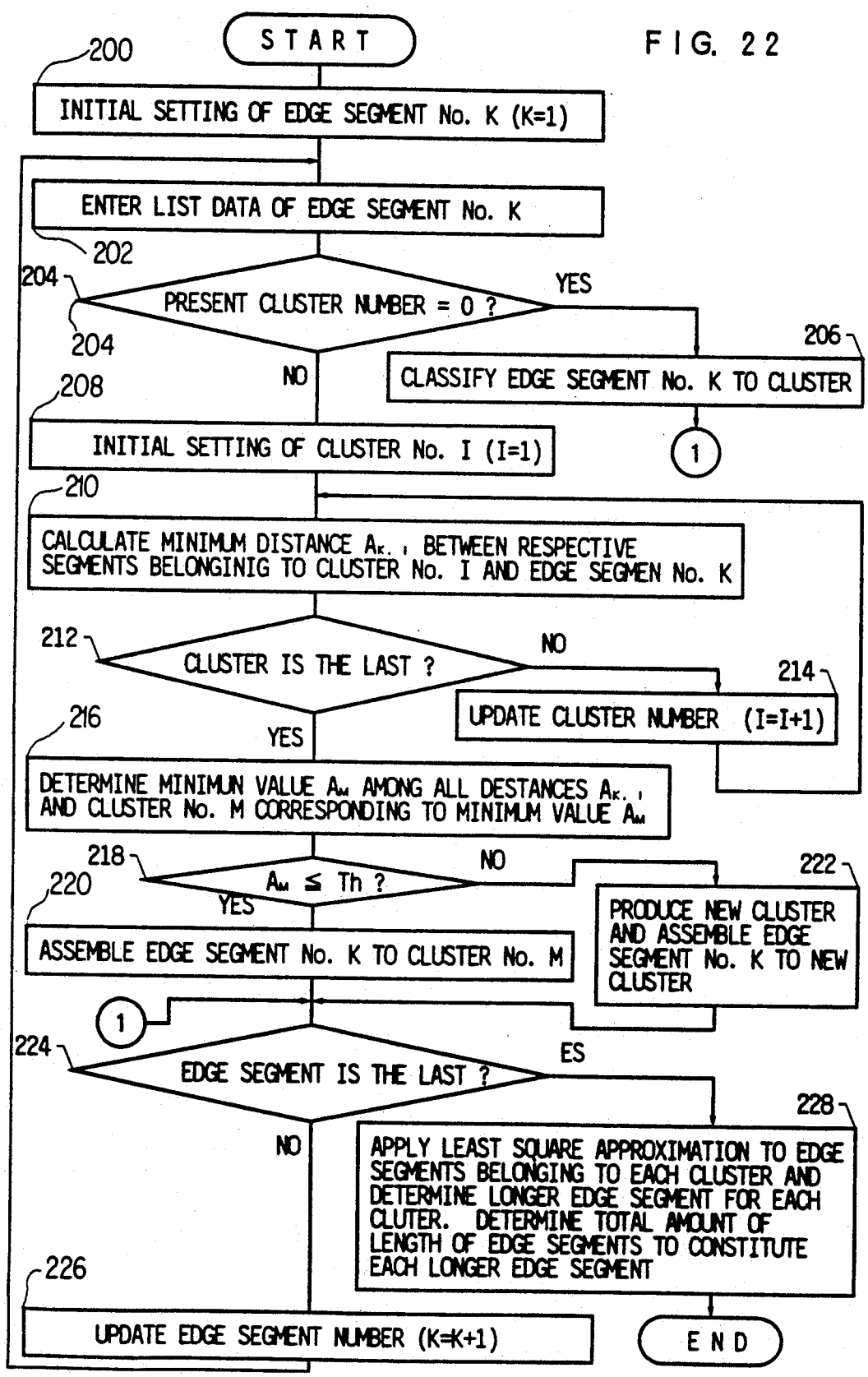

Processing of the above-mentioned clustering circuit 31 is executed specifically in accordance with a flow chart shown in FIG. 22.

In step 200, the edge segment number K is initially set to value 1.

Next in step 202, the edge segment list data of No. K is inputted from the edge segment limiting circuit 34.

Next in step 204, a decision is made as to whether the present cluster number is zero or not. If the decision result is YES, any cluster does not exist. In this case, in step 206, new cluster is produced and the edge segment of No. K is classified to the new cluster. Next jumping to step 224, a decision is made as to whether the edge segment of the decision object is the last segment or not. If it is not the last segment, in step 226, the edge segment No. K is added by 1 and updated.

Next in step 208, the cluster number I of a decision object is initially set to value 1.

Next in step 210, among the respective distances between the respective segments belonging to the cluster of No. I and the edge segment of No. K, the minimum distance A$_{K,I}$ is calculated as a distance between the segment representing the cluster of No. I and the edge segment of No. K.

Next in step 212, a decision is made as to whether the cluster of No. I of the decision object is the last cluster or not. If the decision result is NO, in step 214, the cluster No. I of the decision object is added by 1 to be updated. The process returns to step 210, and for next cluster and the edge segment of No. K, the minimum distance A$_{K,I}$ is calculated similarly. Thus the respective minimum distance A$_{K,I}$ between the respective segment representing the respective of all cluster and the edge segment of No. K is calculated.

In step 212, if a decision is made in that all operations as above described are finished, then in step 216, among all distances A$_{K,I}$, the minimum value A$_M$ is determined, and the cluster No. M corresponding to the minimum value A$_M$ is determined.

Next in step 218, decision is effected as to whether the minimum value A$_M$ is equal to or less than the threshold value Th or not. If the minimum value A$_M$ is equal to or less than the threshold value Th, it is decided that the edge segment of No. K belongs to the cluster of No. M. Then in step 220, the edge segment of No. K is assembled to the cluster of No. M.

On the other hand, in step 218, if a decision is made in that the minimum value AM is more than the threshold value Th, decision is effected in that the edge segment of No. K does not belong to the cluster of No. M. Then in step 222, new cluster is produced, and the edge segment of No. K is assembled to the new cluster.

Next in step 224, a decision is made as to whether the edge segment of the decision object is the last segment or not. If it is not the last segment, in step 226, the edge segment No. K is added by 1 to be updated. The process returns to step 202, and next edge segment list data is inputted from the edge segment limiting circuit 34, and similar processing as above described is repeated.

In step 224, if the edge segment is decided as the last segment and all clusterings regarding the edge segment are finished, process advances to step 228.

In step 228, regarding plural edge segments belonging to each cluster, by the least square approximation, one line most approximating the plural edge segments is determined. This line is extracted as a longer edge segment representing each class. Also the total amount ls$_l$ of length of plural edge segments to constitute the longer edge segment is calculated as extraction degree of the longer edge segment.

The extraction degree becomes one measure to extract guide sign candidates from plural longer edge segments.

Figure 16:
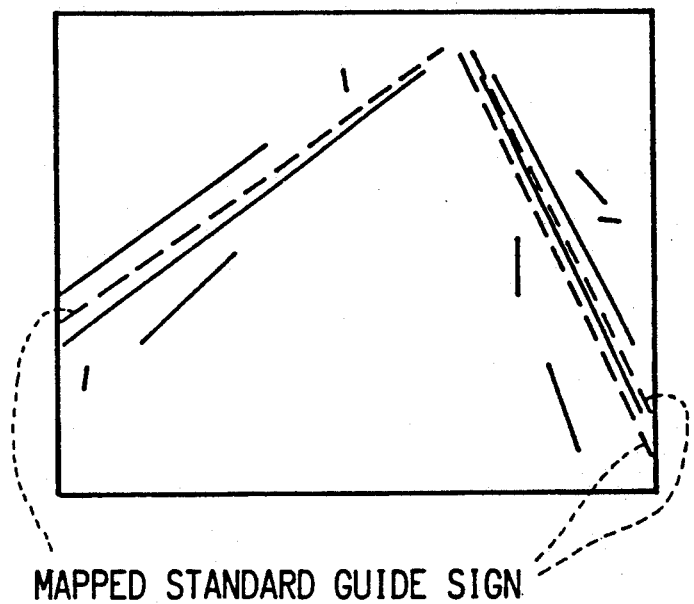
Figure 17:
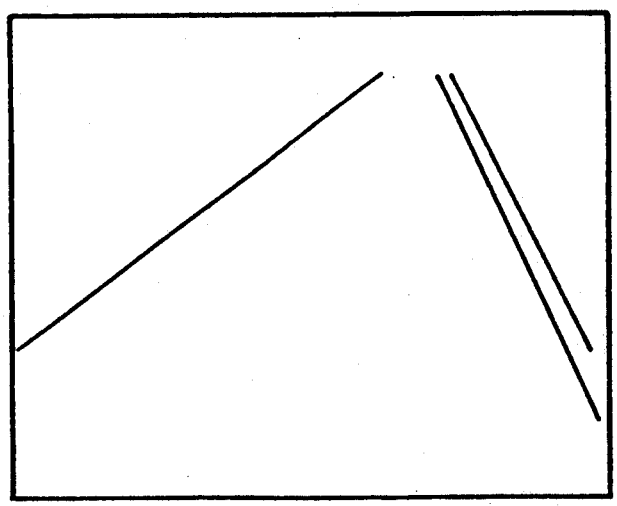

When a plurality of guide signs are seen on the image input plane and the selecting circuit 32 selects a specific longer edge segment as respective candidate for each guide sign, the matching decision circuit 33 starts the position/heading calculating means 4 in accordance with each longer edge segment, and make the calculating means 4 calculate the estimated position and heading of the vehicle. Also the circuit 33 calculates the scattering value among all the estimated position and headings, and calculates the matching value mt defined by reciprocal of the scattering value. When the scattering is more than the previously set threshold value and the matching cannot be taken among the selected guide signs, the circuit 33 performs decision that combination of the selected longer edge segments is wrong. Then the circuit 33 outputs combination of longer edge segments capable of taking the matching and the longer edge segments capable of not taking the matching among various combinations together with the matching value mt into the selecting circuit 32. The selecting circuit 32 inputs the longer edge segments (shown in FIG. 15) outputted by the clustering circuit 31. The selecting circuit 32 applies the coordinate transformation operator of the equation (1) decided from the forecasted position and heading (sb, yb, $\theta$b) of the vehicle at the image input time inputted from the position/heading forecast means 9 to the respective standard guide signs stored in the guide sign storage means 5, whereby the position and direction of the standard guide sign mapped on the image input plane can be calculated. The mapped standard guide signs are shown by dotted lines in FIG. 16. The respective distance between the mapped standard guide sign and the respective longer edge segment shown by solid line in FIG. 16 is determined, and based on this distance value z, the total amount ls$_l$ of length of each edge segment to constitute a longer edge segment outputted by the clustering means 31 and the matching value mt outputted by the matching decision circuit 33, the value of the evaluation function of the equation (4) is calculated. Combination of the longer edge segments corresponding to the respective standard guide signs having the respective largest evaluation value is selected. FIG. 17 shows three extracted longer edge segments corresponding to three standard guide signs. In this case, since combination of the longer edge segments is selected for the respective standard guide signs based on amount of the respective evaluation value, under actual environment, even when many noise segments are mixed or the guide sign cannot be entirely detected, the guide sign can be reproduced as the extracted longer edge segment.

Figure 23:
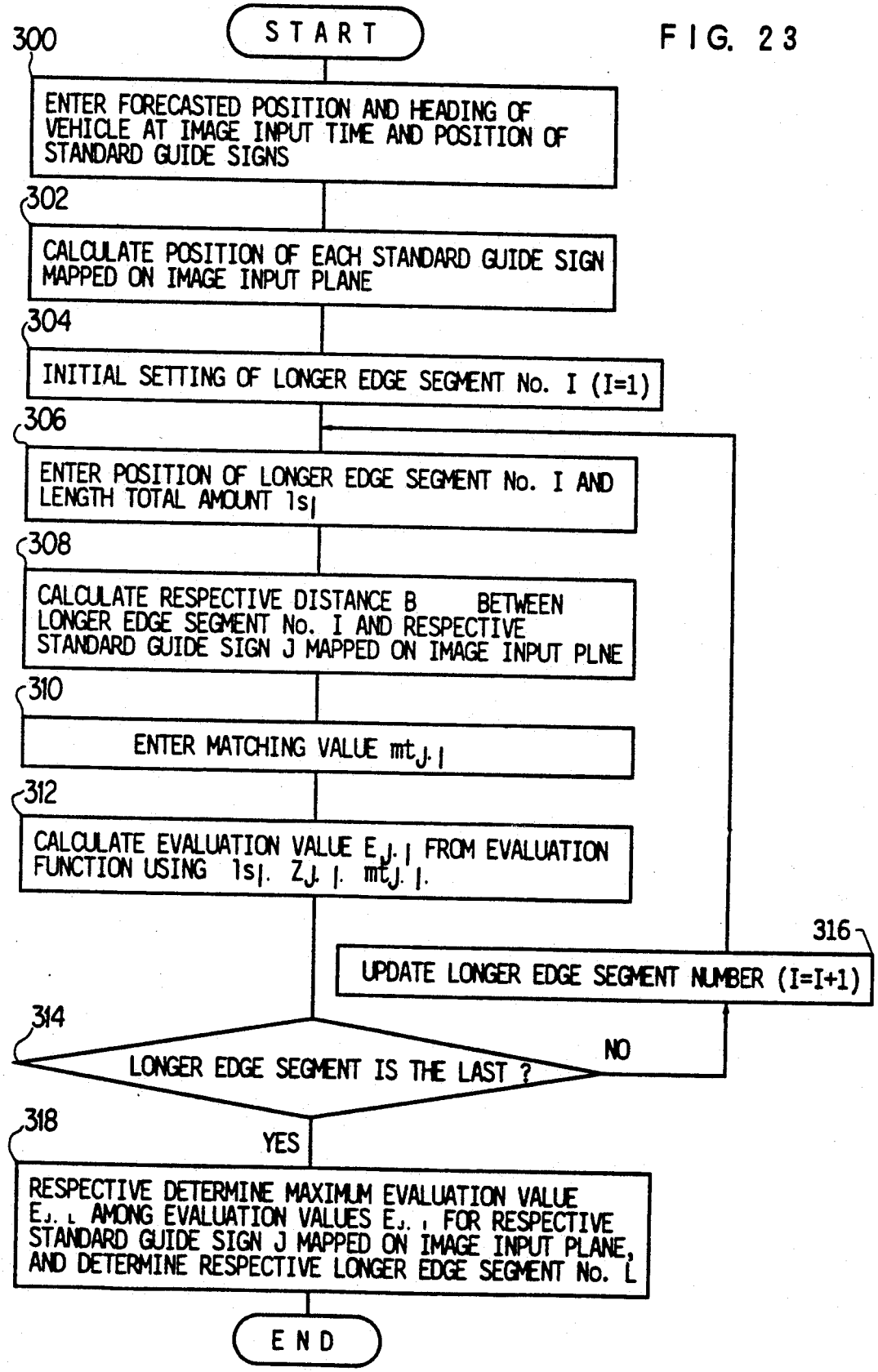

Processing of the selecting circuit 32 is specifically executed based on FIG. 23.

In step 300, the forecasted position and heading of the vehicle at the image input time is inputted from the position/heading forecast means 9. Also position information of the standard guide sign is inputted from the guide sign storage means 5.

Next in step 302, the standard guide sign is mapped onto the image input plane based on the forecasted position and heading of the vehicle, and the mapped position of the standard guide sign can be calculated.

Next in step 304, the longer edge segment No. I is initialized to 1.

Next in step 306, position and the length total amount $ls_I$ of the longer edge segment of No. I are inputted from the clustering circuit 31.

Next in step 308, distance $Z_{J,I}$ between the longer edge segment of No. I and each standard guide sign of No. J mapped onto the image input plane is calculated.

Next in step 310, the matching value $mt_{J,I}$ is inputted from the matching decision circuit 33.

Next in step 312, from the input values $ls_I$, $Z_{J,I}$, $mt_{J,I}$, evaluation value $E_{J,I}$ is determined using the evaluation function of the equation (4). Suffix J,I are numerals added to the mapped standard guide sign and the longer edge segment respectively, and $E_{J,I}$ means the evaluation value of collate for the longer edge segment of No. I and the standard guide sign of No. J. The equation (4) is expressed omitting the suffix J,I.

Next in step 314, decision is effected as to whether the longer edge segment is the last or not. If the longer edge segment is not the last, in step 316, the longer edge segment number I is added by 1 to be updated. Then process returns to step 306, and the above-mentioned operation for next longer edge segment is repeated and the evaluation value E is determined.

Also in step 314, if a decision is made in that the above-mentioned operation is finished to the last longer edge segment, process advances to step 318.

In step 318, for every standard guide sign J mapped onto the image input plane, the maximum value $E_{J,L}$ is determined among plural evaluation values $E_{J,I}$. The longer edge segment number L is determined as the number of the longer edge segment corresponding to the maximum value $E_{J,L}$.

Thus the respective specific longer edge segment best matched with the respective standard guide sign J is extracted.

The vehicle position/heading calculating means 4 operates as follows.

Figure 18:
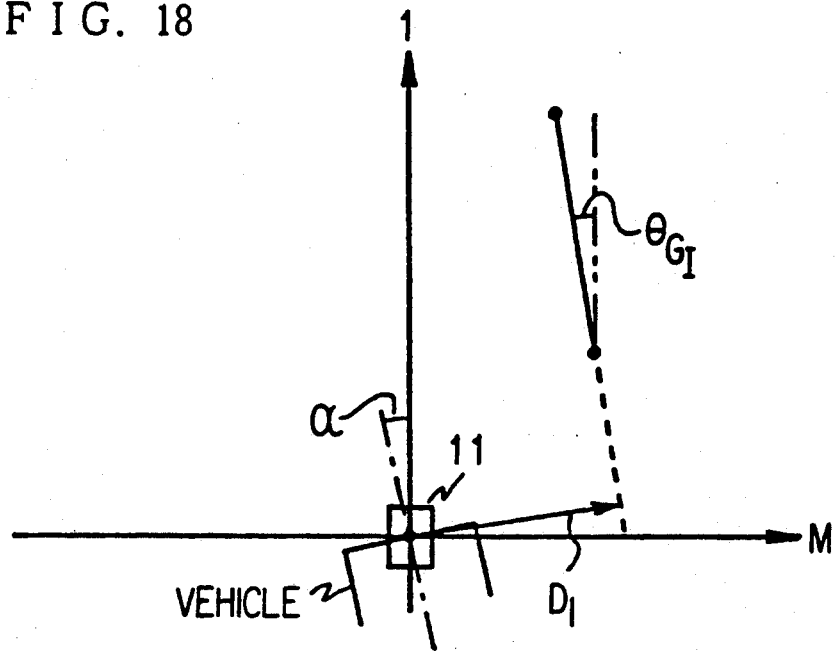

The edge segment reference position/heading means 41 inputs the extracted longer edge segments correspondent to respective standard guide sign shown in FIG. 17, and applies the coordinate transformation operator of the equation (5) to the extracted longer edge segments, whereby the extracted longer edge segments are transformed into the l-m coordinate system. As shown in FIG. 18, the heading estimate value $\theta g_i$ and the distance $d_i$ of the in the l-m coordinate system are calculated, and these values are outputted to the averaging means 43. Also the error values for the position and heading of the extracted longer edge segments are subjected to the coordinate transformation, thereby the error value of each estimate value can be determined.

Figure 19:
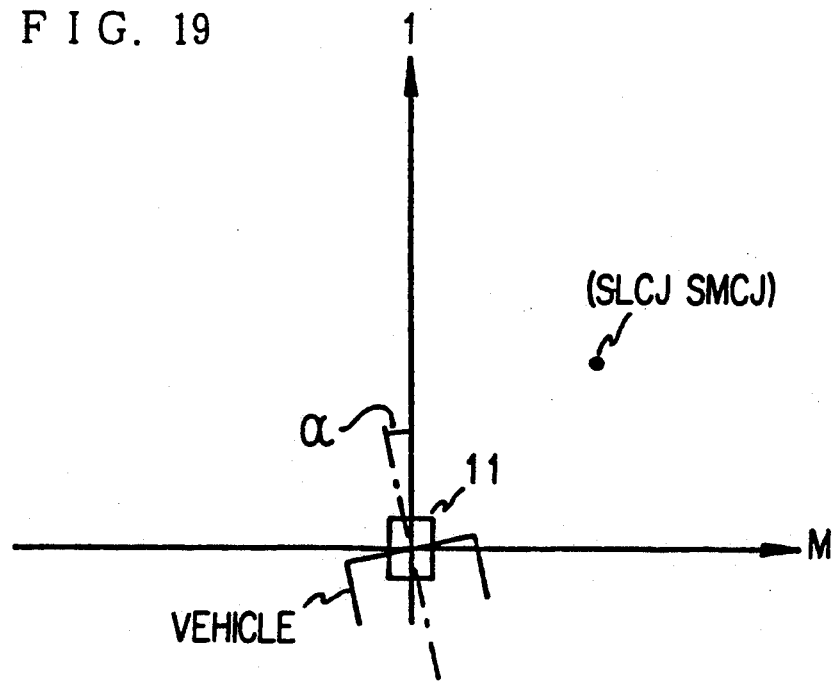

The point reference position/heading operation means 42 inputs end point or intersection of the respective extracted longer edge segment shown in FIG. 17 outputted by the selecting circuit 32, and applies the coordinate transformation operator of the equation (5) to these values to transform these values into the l-m coordinate system. As shown in FIG. 19, relative position of these end points or intersections in the l-m coordinate system and error values are calculated, and these values are outputted to the averaging means 43.

Based on the forecasted position and heading (xb, yb, $\theta$b) of the vehicle at the image input time outputted from the position/heading forecast means 9, heading estimate value $\theta g_i$ of the vehicle and distance $d_i$ of the respective extracted longer edge segment and error value thereof outputted by the edge segment reference position/heading operation means 41 as well as start point and end point positions of the standard guide sign represented by the x-y coordinate system stored in the guide sign storage means 5 corresponding to the respective extracted longer edge segment, and relative position of end point or intersection and error value in th l-m coordinate system outputted by the point reference position/heading operation means 42 as well as end point or intersection position of the guide sign represented in the x-y coordinate system stored in the guide sign storage means 5 corresponding to the respective extracted longer edge segment, the respective estimated position and heading corresponding to the respective extracted longer edge segment is calculated. The averaging means 43 averages the respective estimated position and heading corresponding to the respective standard guide sign based on each error value to output the averaged estimated position and heading (xv, yv, $\theta$v) in the x-y coordinate system of the vehicle at the image input time.

The position/heading reliability evaluation means 74 inputs evaluation value for the respective extracted longer edge segment, calculated by the selecting circuit 32 of the guide sign searching means 3, and evaluates reliability of the estimated position and heading of the vehicle calculated by the position/heading calculating means 4 based on the respective evaluation value E. In the selecting circuit 32, the extracted longer edge segments with the largest evaluation value are decided. The evaluation value of the reliability is different every time depending on respective distance between the respective longer edge segment and the respective mapped standard guide sign, the total amount of length of edge segments to constitute the respective extracted longer edge segment, and the respective matching value obtained from the matching decision circuit 33. Since this value represents the measure of reliability of the selection at that time, it may be adopted as the evaluation value of reliability.

STEP 4 in FIG. 25

In the position/heading integrating means 7, the memory 71 stores the current position and heading (x, y, $\theta$) of the vehicle and the error values thereof. When the estimated position and heading (xv, yv, $\theta$v) of the vehicle is outputted from the position/heading calculating means 4, by the timing signal outputted from the synchronous circuit 73 at the timing $t_e$ in FIG. 24, the current forecasted position and heading (xo, yo, θo) calculated by the operation circuit 63 is inputted to the position/heading integrating means 7. The current position and heading (x, y, θ) stored in the memory 71 is updated by the current forecasted position and heading (xo, yo, θo) by the operation circuit 72 at the timing $t_e$ in FIG. 24. Then the counter value ne of the position/heading measuring means 6 is cleared, and the measuring of the position/heading measuring means 6 is restarted.

STEP 6 in FIG. 25

Next the operation circuit 72 calculates difference (x1, y1, θ1) between the current forecast position and heading (xo, yo, θo) and the image input time forecasted position and heading (xb, yb, θb) as shown in FIG. 26.

Next the operation circuit 72 calculates the image input time calibrated position and heading (xm, ym, θm) by the equation (6), based on the image input time estimated position and heading (xv, yv, θv) and error values thereof, reliability evaluation value c outputted from the position/heading reliability evaluation means 74, and the image input time forecasted position and heading (xb, yb, θb).

STEP 7 in FIG. 25

This image input time calibrated position and heading (xm, y, θm) is compensated for the difference (x1, y1, θ1) by the equations (8), (9), (10), (11) as shown in FIG. 26. The current compensated position and heading (xc, yc, θc) on the present traveling plane and error values thereof are stored in the memory 71 as a new current position and heading (x, y, θ).

Controlling the Position and Heading of the Vehicle

The speed control means 75 performs decision as to whether the measuring state of position and headings of the vehicle is good or not, based on value of reliability outputted by the position/heading reliability evaluation means 74, and if the measuring state is not good, the speed control means 75 controls the traveling control means 200 so that the traveling speed of the vehicle is decreased or rise of the speed is suppressed.

Figure 20:
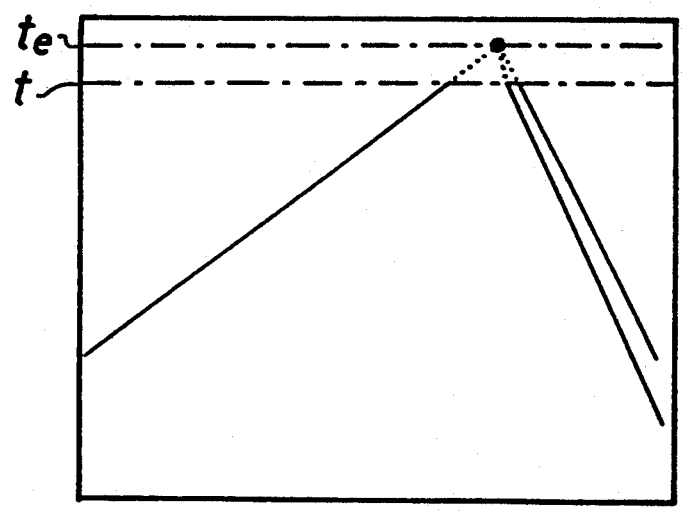
FIG. 20 is a diagram showing correction of tilt angle in a TV camera.

When a plurality of guide signs are seen on the image input plane and the position/heading reliability evaluation means 74 performs decision that reliability exists, the tilt angle calibration means 81 as the camera calibration means 8 inputs the extracted longer edge segment ($Sxs_i$, $Sys_i$)-($Sxe_i$, $Sye_i$) selected by the selecting circuit 32. The calibration means 81 determines heading of the vehicle by the vehicle position/heading calculating means 4, and calculates the correction value te of the tilt angle so that scattering of the heading becomes small, and corrects value of tilt angle t used in the coordinate transformation operation of the guide sign searching means 3 and the position/heading calculating means 4. FIG. 20 is an explanation diagram showing this state. In this example, since a plurality of guide signs are in parallel on the traveling plane, the guide signs have the same vanishing point on the horizon. Consequently, scattering of the angle is decreased, whereby the horizon with the vanishing point crossing on one point can be determined. Thereby influence of shaking of the vehicle or setting mistake of camera parameters t, h, under actual environment may be eliminated.

As above described, in the device of the embodiment, based on the image F obtained from the image input means 1 and rotation of the measuring wheels obtained from the position/heading measuring means 6, the present compensated of position and heading (xc, yc, θc) represented in the standard coordinate system fixed to the ground on the traveling plane of the vehicle is determined. Since the edge segment extracting means 2 and the guide sign searching means 3 are provided, under actual environment condition where many noise components are mixed in the input image, the device may be adapted pliably and exact calculation of position and heading becomes possible.

The traveling control means 200 inputs the current position and heading (x, y, θ) represented in the x-y coordinate system stored in the memory 71 of the position/heading integrating means 7, parameter values of the traveling course stored in the traveling course storage means 100 and the speed command value to the acceleration operation circuit 201, and determines acceleration values (ar, al) of the lateral drive wheels required for traveling on the given traveling course at the given speed from the present state of position and heading, speed and acceleration the self controlled vehicle. The acceleration value is inputted to the integration circuit 202 and integrated, and the rotational speed (vr, vl) being the actual drive amount of the lateral drive wheels is determined. Also the rotational speed of the drive amount is controlled in accordance with the control command outputted by the speed control means 75.

In the drive means 300, based on the drive amount given from the traveling control means 200, the servo circuit 301 controls rotation of the motor 302 and drives the drive mechanism 303 including a clutch, a gear and drive wheels.

As above described, the vehicle can travel along a traveling course stored in a traveling course storage means a high accuracy while determining position and heading of the vehicle.

Next, effects of the embodiment will be described.

First, in the device, since the guide sign is specified not to a specific mark or a white line but only to edge segment, selective range of the guide sign is wide, and the guide sign need not be newly set but may be selected from existing environment. Also since the edge sign is relatively strong to noise, adaptability to environment becomes high.

Since the guide sign storage means 5 is provided and different guide signs may be specified at every traveling area, the selective range of the guide signs is further extended and plural guide signs may be set or no guide sign may be set in so area. Also since edge segment capable of entering the input image may be used and the position is stored in the standard coordinate system fixed to the ground on the traveling plane, the position relation between the traveling course and the guide sign may be selected freely and change of the traveling course may be performed relatively independently, whereby flexibility of the traveling is high. Since not only the position of the guide sign but also the gradient direction ggr of grey edge are stored, searching mistake of the guide sign is reduced and the selective range thereof is extended.

Since the position/heading measuring means 6 is installed, values of position and heading of the vehicle being different from that of the position/heading calculating means 4 in measuring period and error can be obtained. These values are integrated by the position/heading integrating means 7, whereby the measuring error of the final value of position and heading of the vehicle is decreased and the reliability of the measuring can be improved. Also forecast values of position and heading of the vehicle at the image input time are utilized in calculating position and heading based on the image information of a TV camera, and since the position/heading measuring means 6 is installed, the forecast values of position and heading can be improved in accuracy and reliability, whereby the device contributes to improve the processing speed, accuracy and reliability in calculating position and heading based on the image information.

The synchronous circuit 73 of the position/heading integrating means 7 outputs the timing signal into the operation circuit 63 to start it to calculate the forecasted position and heading at the finishing time of the image processing. Thereby even if the measuring timing of the position/heading measuring means 6 and the finishing timing of the image processing are different, the current position and heading can be accurately compensated. Consequently, position and heading outputted by the position/heading calculating means 4 and the position and heading operated in the position/heading integrating means 7 can be improved in accuracy and reliability. Also this contributes to correction of time delay for the image input time with high accuracy when the position/heading calculating means outputs estimate values of position and heading based on the information of the TV camera.

Since the position/heading forecast means 9 stores the values of position and heading of the vehicle at the image input time as forecast values of position and heading in the memory thereby holding the position and heading at that time, even if time delay is produced between the image input time and the calculating time of the estimate values of position and heading based on this, integrating of the position and heading can be performed. Thereby the time for processing the information of the TV camera has slight margin, and the hardware scale can be suppressed. Also using these values, reliability can be improved in the guide sign searching means 3 during measuring the position and heading based on the information of the TV camera. Using these values in the edge segment limiting circuit 34 and the selecting circuit 32, the processing speed and reliability of selecting the guide signs can be improved. Further in the vehicle position/heading calculating means 4, these values are used in calculating the estimate values of position and heading of the vehicle in the averaging means, whereby accuracy and reliability of the estimated values of position and heading can be improved.

Since the edge segment extracting means 2 extracts a grey edge segment and outputs the list data L comprising the start point (Sps$_k$, Sqs$_k$), the end point (Spe$_k$, Sqe$_k$), length sk, gradient Sgr$_k$ of the segment in the coordinate system on the image input surface, whereby it compresses and takes only the edge segment necessary for searching the guide signs among the input image data with much information, the searching processing of the guide signs can be performed easily at high speed by the guide sign searching means 3 at next stage. Thereby use of the edge segment sign having relatively high reservation for environment condition becomes possible, and the application range of the device can be extended.

The edge segment limiting means 34 calculates forecast region (window region) of the guide sign and forecast angle of the guide sign, and investigates whether each segment outputted by the edge segment extracting means 2 is included in range of the forecast region and the forecast angle of the guide sign or not, whereby edge segments being other than the guide sign and not included in the range are limited so that unnecessary edge segments are removed, and speed of hereinafter processing is increased and possibility of erroneous operation caused by mixing of unnecessary data can be suppressed. Since the erroneous operation can be suppressed even under actual environment where many noise segments may be mixed, the application range of the device can be extended.

The clustering circuit 31 inputs edge segments outputted from the edge segment extracting means 2 and performs the clustering processing, thereby making edge segments included in the same line one edge segment. Since under actual environment guide signs are outputted not as one edge segment but as several broken short edge segments from the edge segment extracting means 2 due to illuminating condition, an obstacle, contamination, breakage or the like, by the clustering processing, the original longer line segment is extracted from the broken edge segments so as to enable the searching of the guide signs. In this processing, the adaptability to environment can be improved and the application range of self controlled vehicles can be extended. Also the total amount of length of the edge segments to constitute one segment is calculated and outputted, whereby the extraction degree of the edge segment being the origin of the segment can be expressed and can be made one standard while performing selection.

Since the matching decision circuit 33 between plural guide signs is installed, when a plurality of guide signs are seen on the picture plane and the selecting circuit 32 selects edge segments of candidate for each guide sign, the matching between candidates can be investigated and the matching value can be outputted to the selecting circuit 32, whereby selection mistake of guide signs due to mixing of the noise segments can be suppressed and the adaptability to environment can be improved and the application range of self controlled vehicles can be extended.

Since the selecting circuit 32 is installed, based on the distance value between the forecast position of the guide sign and the edge segment, the total amount of length of the edge segments to constitute the edge segment outputted by the clustering circuit 31, and the decision result of matching of the matching decision circuit 33 between plural guide signs, the evaluation function can be calculated and combination of candidate edge segments for each guide sign obtaining the largest evaluation value can be selected. Consequently, under actual environment, even when many noise segments are mixed on the image input surface or the guide signs cannot be detected entirely, the guide signs can be selected and the adaptability to the environment can be improved and the application range of self controlled vehicles can be extended.

The vehicle position/heading calculating means 4 is provided with an edge segment reference position/heading operation means 41 and a point segment reference position/heading operation means 42, thereby obtaining several estimate values of position and heading being different in accuracy. The calculating means 4 is further provided with averaging means 43, whereby the values of position and heading and the forecast values of position and heading (xb, yb, $\theta$b) of the vehicle at the image input time are integrated so that the estimate values of position and heading can be improved in accuracy and reliability.

The position/heading reliability evaluation means 74 is installed, thereby reliability of estimate values of position a heading of the vehicle calculated by the position/heading calculating means 4, and when reliability in the position/heading integrating means 7 is little, that is, when possibility of mistake exists, values of position and heading of the vehicle can be prevented from being affected by the values. Thus, end deterioration of the values of position and heading is prevented and erroneous operation of the vehicle under actual environment is prevented, whereby the safety is improved.

Since the tilt angle correcting means 81 is provided, correction value te of tilt angle is calculated based on plural guide signs appearing on the picture plane, thereby correcting value t of tilt angle used in the coordinate transformation operation of t guide sign searching means 3 and the position/heading calculating means 4. Consequently, influence of shaking of the vehicle under actual environment or influence of setting mistake of the camera parameter can be suppressed, and accuracy and reliability of the estimate values of position and heading are improved.

Since the speed control means 75 is provided, a decision is made as to whether the measuring state of position and heading of the vehicle is good or not based on value of reliability outputted by the position/heading reliability evaluation means 74, and the traveling control means 200 can be controlled so that when the measuring state is not good, the traveling speed of the vehicle is decreased or rise of the speed is suppressed, whereby generation of erroneous operation of the vehicle under actual environment is prevented and the safety is improved.

Since the position/heading integrating means 7 is provided, estimate values of position and heading obtained from the position/heading calculating means 4, estimate values of position and heading obtained from the position/heading measuring means 6 and values of position and heading of the vehicle held in the memory 71 can be integrated in response to error or reliability of these values, whereby deterioration of the accuracy due to the estimate values with large error is suppressed and the values of position and heading can be updated. Also since the synchronous circuit 73 is provided, the values of position and heading at the image input time and the values of position and heading of the vehicle stored in the memory 71 at the output time of the estimate values of position and heading by the position/heading calculating means can be improved in accuracy, and even when the estimate values of position and heading at the image input time are obtained accompanied by the time delay based on the operation processing, the integrating of the present position can be performed with high accuracy thereby improving accuracy and reliability of the values of position and heading of the vehicle.

According to the embodiment, the absolute position and heading in the coordinate system fixed to the traveling plane of the vehicle, extracted from the grey edge segments from the input image and further determined based on the longer edge segment selected in consideration of matching with the previously stored guide signs, and the absolute position and heading of the vehicle obtained from the rotational amount of the measuring wheels arranged to the vehicle, are integrated in consideration of difference of the calculation time of both, whereby the exact position and heading on the traveling plane of the vehicle can be determined at real time during traveling. That is, in the case of measuring based on the measuring wheels only, since the measuring error attendant upon the rotation irregularity of the measuring wheels to the traveling road surface is accumulated, particularly during traveling of the long distance, the measuring value of position and heading becomes inexact. On the other hand, in determination of the position and heading based on the input image, since definite operation processing time is required, particularly during traveling of the long distance, deviation is produced between the values of position and heading determined only by the image processing and the present values. In the embodiment, these problems can be solved simultaneously.

Further since the traveling driving is performed based on the values of position and heading and the traveling course information of target previously stored, the vehicle can travel exactly along the traveling course.

What is claimed is:

1. A position and heading direction detecting device for a self-controlled vehicle, comprising:
   image input means for inputting an image of an outer environment of the self-controlled vehicle;
   edge segment extracting means for receiving said image inputted by said image input means and for extracting and outputting edge segments of said image;
   guide sign searching means comprising
   clustering means for entering said edge segments extracted by said edge segment extracting means, for evaluating an alignment property of said edge segments based on respective mutual angle and distance relationships between any two of said edge segments, for assembling said edge segments evaluated to be on the same line into longer edge segments, and for outputting each of the assembled longer edge segments, and
   selecting means for selecting one of said longer edge segments, corresponding to at least one guide sign, from among said assembled longer edge segments outputted from said clustering means, wherein said selected longer edge segment is selected based on at least one of a reference position and a reference angle of said at least one guide sign, said reference position and reference angle corresponding to a location of the outer environment; and
   vehicle position/heading direction calculating means for transforming said longer edge segment selected by said selecting means into coordinates corresponding to known locations of the outer environment, for calculating a position of the vehicle relative to said selected longer edge segment in the transformed coordinates to decide a position and heading direction of the vehicle.

2. A detecting device as set forth in claim 1, further comprising:
   guide sign storage means for setting a respective guide sign for every location in the outer environment of the vehicle and for storing at least position information of said guide sign,
   wherein said guide sign searching means selects said longer edge segment corresponding to said respective guide sign based on said position information of said guide sign stored in said guide sign storage means.

3. A detecting device as set forth in claim 1, further comprising:
position/heading direction measuring means for measuring a current position and heading direction of the vehicle; and
position/heading direction integrating means for calculating the position and heading direction of the vehicle based on said position and heading direction of the vehicle calculated by said vehicle position/heading direction calculating means and said position and heading direction measured by said position/heading direction measuring means.

4. A detecting device as set forth in claim 1, further comprising:
guide sign storage means for storing a set of plural guide signs corresponding to each of plural locations in the outer environment of the vehicle; and
said guide sign searching means having matching decision means for deciding respective degrees of matching in a respective set of plural positions and heading directions of the vehicle, based on a respective set of plural longer edge segments arbitrarily selected in accordance with said set of plural guide signs corresponding to each of said plural locations in the outer environment of the vehicle,
wherein said selecting means determines said selected longer edge segment corresponding to a respective guide sign among said longer edge segments based on said degree of matching decided by said matching decision means.

5. A detecting device as set forth in claim 1, further comprising:
guide sign storage means for storing a set of plural guide signs corresponding to each of a plurality of locations in the outer environment of the vehicle; and
said guide sign searching means having matching decision means for deciding respective degrees of matching in a respective set of plural positions and heading directions of the vehicle decided by said vehicle position/heading direction calculating means based on a respective set of plural longer edge segments arbitrarily selected in accordance with said set of plural guide signs corresponding to said plurality of locations in the outer environment of the vehicle,
wherein said selecting means determines said respective selected longer edge segment corresponding to said respective guide sign among said longer edge segments based on said degree of matching and a length and distance corresponding to said guide sign for said respective longer edge segment, said length being outputted from said clustering means, said distance being calculated by said guide sign searching means.

6. A detecting device as set forth in claim 1, further comprising:
guide sign storage means for storing plural guide signs corresponding to each of a plurality of locations in the outer environment of the vehicle; and
camera calibration means for calibrating a tilt angle of said image input means for use in calculating said position and heading direction of said vehicle by said vehicle position/heading direction calculating means based on said plural selected longer edge segments to collate said plural guide signs respectively selected by said selecting means.

7. A detecting device as set forth in claim 1, further comprising:
position/heading direction forecast means for forecasting the position and heading direction of the vehicle at a time when said image is input by said image input means,
wherein said guide sign searching means limits a region to select said longer edge segment corresponding to said at least one guide sign based on the position and heading direction of the vehicle forecasted by said position/heading direction forecasting means at the time when said image is input by said image input means.

8. A detecting device as set forth in claim 2, further comprising:
position/heading direction forecast means for forecasting the position and heading direction of the vehicle at a time when said image is input by said image input means,
wherein said guide sign searching means maps said guide sign stored in said guide sign storage means onto the image coordinates based on the position and heading direction of the vehicle forecasted by said position/heading direction forecast means at the time when said image is input by said image input means, and selects said longer edge segment corresponding to said guide sign based on said mapped guide sign.

9. A detecting device as set forth in claim 1, further comprising:
position/heading direction forecast means for forecasting the position and heading direction of the vehicle at a time when said image is input by said image input means,
wherein said vehicle position/heading direction calculating means determines corrected values for the position and heading direction of the vehicle, at the time when said image is input by said image input means, based on the position and heading direction of the vehicle determined from said selected longer edge segment and the position and heading direction of the vehicle forecasted by said position/heading direction forecast means at the time when said image is input by said image input means, and calculates the current position and heading direction of the vehicle based on the corrected values.

10. A detecting device as set forth in claim 3, further comprising:
position/heading direction forecast means for forecasting the position and heading direction of the vehicle, at a time when said image is input by said image input means, in accordance with output from said position/heading direction measuring means,
wherein said position/heading direction integrating means calculates a calibrated position and heading direction of the vehicle, at the time when said image is input by said image input means, said calibrated position and heading direction being determined by said selected longer edge segment and the position and heading direction of the vehicle forecasted by said position/heading direction forecast means at the time when said image is input by said image input means, and calculates a displacement between said current position and heading direction of the vehicle obtained by said position/heading direction measuring means and the position and heading direction of the vehicle forecasted by said position/heading direction forecast means at the time when said image is input by said image input means, and determines a new current position and new heading direction of the vehicle based on said calibrated position, said heading direction and said displacement.

11. A detecting device as set forth in claim 1, further comprising:

position/heading direction measuring means for measuring a current position and heading direction of the vehicle;

position/heading direction forecast means for forecasting the position and heading direction of the vehicle, at a time when said image is input by said image input means, in accordance with output from said position/heading direction measuring means; and position/heading direction integrating means for calculating a calibrated position and heading direction of the vehicle at the time when said image is input by said image input means based on the position and heading direction of the vehicle determined from said selected longer edge segment by said vehicle position and heading direction calculating means, and also based on the position and heading direction of the vehicle forecasted by said position/heading direction forecast means at the time when said image in input by said image input means.

12. A detecting device as set forth in claim 3, wherein said position/heading direction measuring means measures the position and heading direction by measuring the revolutions of a wheel of the vehicle.

13. A detecting device as set forth in claim 7, wherein said position/heading direction forecast means measures the revolutions of a wheel of the vehicle and forecasts the position and heading direction of the vehicle at the time when said image is input by said image input means.

14. A detecting device as set forth in claim 7, wherein said position/heading direction forecast means forecasts the position and heading direction of the vehicle, at the time when said image is input by said image input means, based on the position and heading direction of the vehicle calculated by said vehicle position/heading direction calculating means.

* * * * *